US011184754B2

(12) United States Patent
Jiang

(10) Patent No.: US 11,184,754 B2
(45) Date of Patent: Nov. 23, 2021

(54) DATA SHARING METHOD AND TERMINAL

(71) Applicant: Huawei Technologies Co., Ltd., Shenzhen (CN)

(72) Inventor: Mengxue Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 16/331,066

(22) PCT Filed: Sep. 6, 2016

(86) PCT No.: PCT/CN2016/098201
§ 371 (c)(1),
(2) Date: Mar. 6, 2019

(87) PCT Pub. No.: WO2018/045487
PCT Pub. Date: Mar. 15, 2018

(65) Prior Publication Data
US 2019/0200203 A1  Jun. 27, 2019

(51) Int. Cl.
*H04W 4/80*  (2018.01)
*H04L 29/06*  (2006.01)
(Continued)

(52) U.S. Cl.
CPC ........... *H04W 4/80* (2018.02); *H04L 63/0861* (2013.01); *H04W 12/06* (2013.01); *G06F 3/017* (2013.01)

(58) Field of Classification Search
CPC ......... H04W 4/80; H04W 12/06; H04W 4/60; H04W 76/14; H04W 12/002; H04L 63/0861; G06F 3/017
See application file for complete search history.

(56) References Cited

U.S. PATENT DOCUMENTS

2005/0091539 A1 * 4/2005 Wang ..................... G06F 21/31
726/4
2011/0124286 A1 * 5/2011 Tanaka .................. H04W 76/14
455/41.1
(Continued)

FOREIGN PATENT DOCUMENTS

CN  103179281 A  6/2013
CN  103473376 A  12/2013
(Continued)

OTHER PUBLICATIONS

Zhu Jianting • et al , Method, system and cloud server for multi-device safe logging, Jun. 6, 2013, CN 103281327 B.*
(Continued)

*Primary Examiner* — Ajit Patel
*Assistant Examiner* — Wilfred Thomas
(74) *Attorney, Agent, or Firm* — Conley Rose, P.C.

(57) ABSTRACT

A data sharing method between a plurality of intelligent terminals, where a first terminal determines, based on a gesture operation instruction from a user for an application, a near-field wireless transmission mode for data transmission with a second terminal. The application is an application selected by the user and whose data is to be shared with the second terminal. The first terminal transmits the data of the application to the second terminal based on the near-field wireless transmission mode for the data transmission with the second terminal such that the second terminal displays the data of the application and starts the application.

20 Claims, 22 Drawing Sheets

(51) Int. Cl.
*H04W 12/06* (2021.01)
*G06F 3/01* (2006.01)

(56) References Cited

U.S. PATENT DOCUMENTS

| | | | | |
|---|---|---|---|---|
| 2011/0312278 | A1* | 12/2011 | Matsushita | G08C 17/02 455/66.1 |
| 2013/0196629 | A1 | 8/2013 | Masuoka | |
| 2013/0210488 | A1* | 8/2013 | Lee | H04N 21/42224 455/557 |
| 2014/0024341 | A1* | 1/2014 | Johan | H04N 21/43615 455/411 |
| 2014/0080469 | A1 | 3/2014 | Ko et al. | |
| 2014/0258707 | A1 | 9/2014 | Denny | |
| 2015/0143492 | A1* | 5/2015 | Berry | H04W 12/06 726/7 |
| 2015/0256391 | A1* | 9/2015 | Hardy | H04L 41/5054 709/222 |
| 2016/0132286 | A1* | 5/2016 | Wu | G06F 3/0346 715/716 |
| 2016/0261975 | A1 | 9/2016 | Kurihara | |
| 2017/0048252 | A1* | 2/2017 | Straub | H04L 67/06 |
| 2017/0338973 | A1 | 11/2017 | Guo et al. | |
| 2019/0164156 | A1* | 5/2019 | Lindemann | H04L 9/3239 |

FOREIGN PATENT DOCUMENTS

| | | |
|---|---|---|
| CN | 103677257 A | 3/2014 |
| CN | 104768126 A | 7/2015 |
| CN | 105828274 A | 8/2016 |
| JP | 2010136238 A | 6/2010 |
| JP | 2013157969 A | 8/2013 |
| JP | 2014053007 A | 3/2014 |
| JP | 2015103899 A | 6/2015 |
| JP | 2016163280 A | 9/2016 |
| KR | 20140032768 A | 3/2014 |
| KR | 20150026657 A | 3/2015 |
| KR | 20160048018 A | 5/2016 |
| WO | 2015080347 A1 | 6/2015 |
| WO | WO2015093677 A1 * | 6/2015 ............... H04B 1/40 |
| WO | 2016064250 A2 | 4/2016 |

OTHER PUBLICATIONS

Machine Translation and Abstract of Chinese Publication No. CN103677257, Mar. 26, 2014, 28 pages.
Machine Translation and Abstract of Chinese Publication No. CN105828274, Aug. 3, 2016, 36 pages.
Foreign Communication From A Counterpart Application, Chinese Application No. 201680028464.0, Chinese Office Action dated Dec. 10, 2019, 7 pages.
Machine Translation and Abstract of Chinese Publication No. CN103179281, Jun. 26, 2013, 10 pages.
Machine Translation and Abstract of Chinese Publication No. CN103473376, Dec. 25, 2013, 17 pages.
Machine Translation and Abstract of Chinese Publication No. CN104768126, Jul. 8, 2015, 12 pages.
Foreign Communication From A Counterpart Application, PCT Application No. PCT/CN2016/098201, English Translation of International Search Report dated Apr. 28, 2017, 2 pages.
Foreign Communication From A Counterpart Application, PCT Application No. PCT/CNCN2016/098201, English Translation of Written Opinion dated Apr. 28, 2017, 3 pages.
Foreign Communication From A Counterpart Application, European Application No. 16915423.4, Extended European Search Report dated Jul. 4, 2019, 8 pages.

* cited by examiner

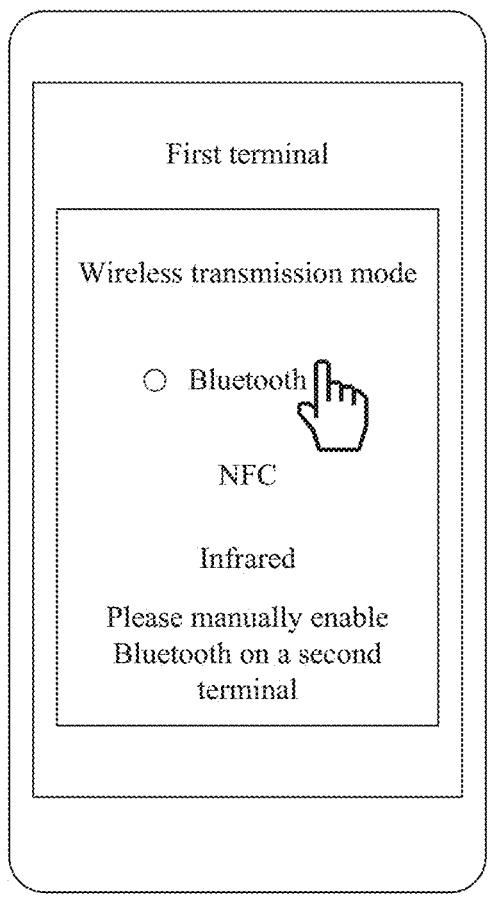
FIG. 4-1-A

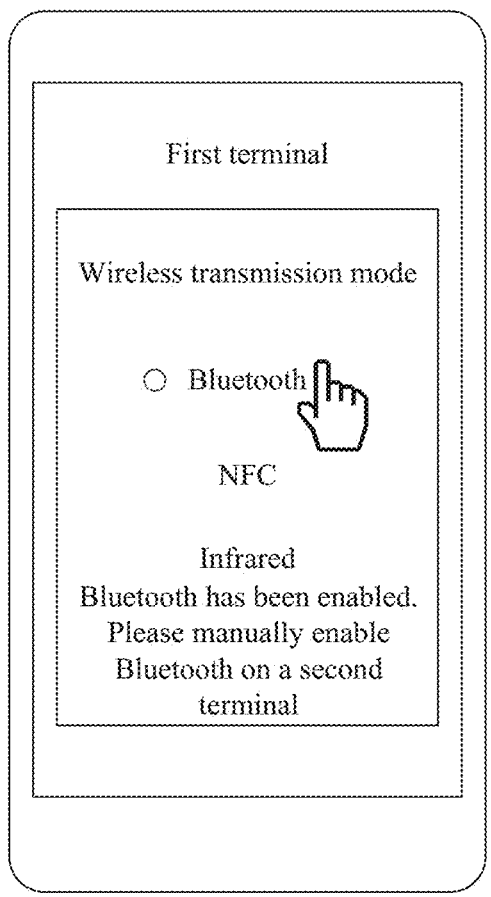
FIG. 4-1-B

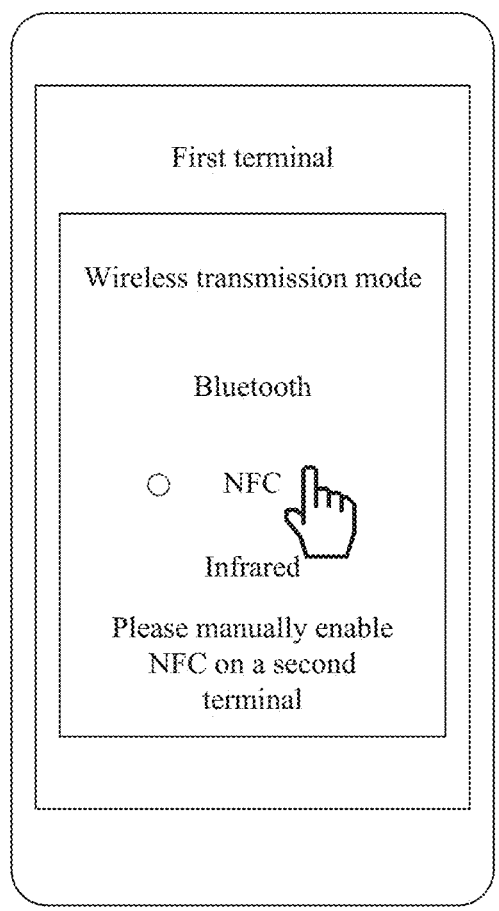
FIG. 4-2-A

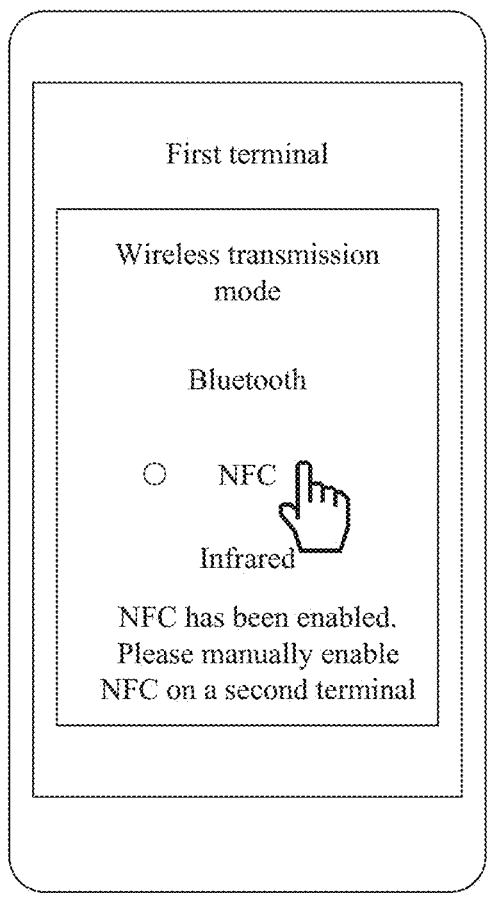
FIG. 4-2-B

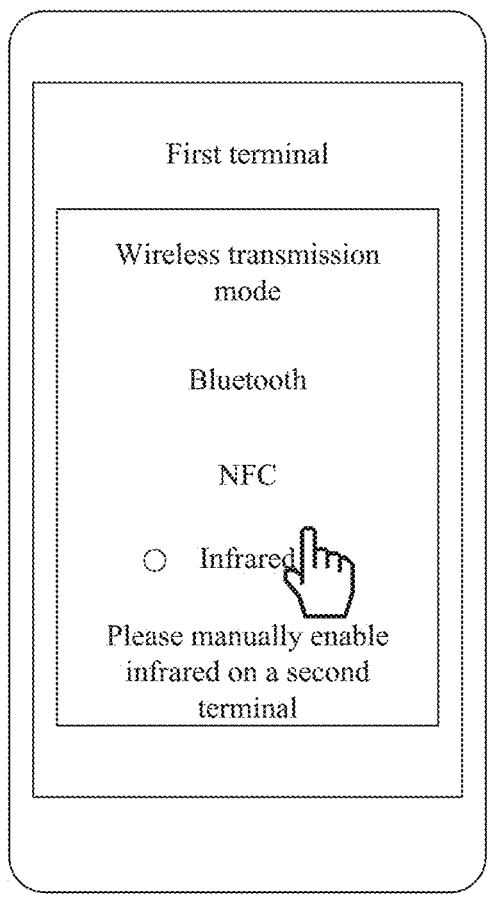
FIG. 4-3-A

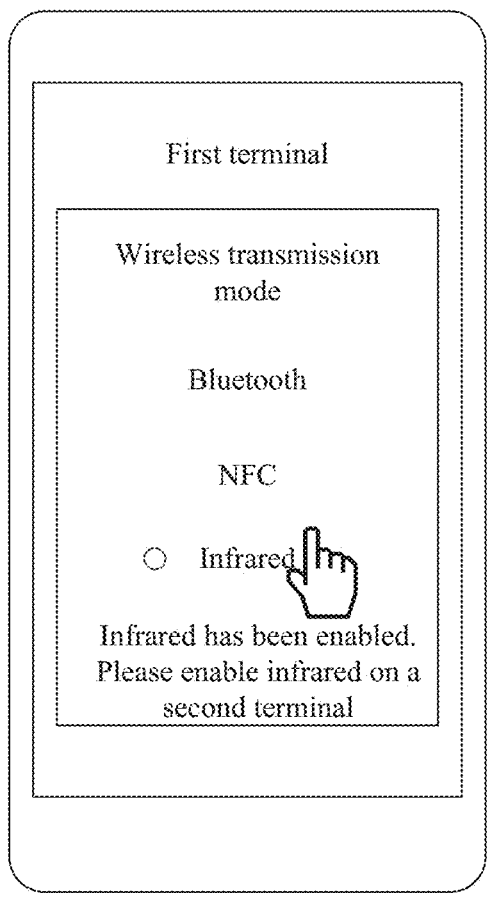
FIG. 4-3-B

DATA SHARING METHOD AND TERMINAL

CROSS-REFERENCE TO RELATED APPLICATIONS

This application is a U.S. National Stage of International Patent Application No. PCT/CN2016/098201 filed on Sep. 6, 2016, which is hereby incorporated by reference in its entirety.

TECHNICAL HELD

The present invention relates to the field of communications technologies, and in particular, to a technology of sharing application information between a plurality of intelligent terminals.

BACKGROUND

At present, as intelligent terminals (for example, smartphones, tablet computers, and wearable devices) become increasingly popular in people's life, a user may have two or more intelligent terminals at the same time.

In a scenario, after a user uses an application on an intelligent terminal, the user also wants to use the same application on another intelligent terminal. In this case, the user needs to install the application on the another intelligent terminal, and may further need to enter a corresponding account and password of the application. However, in the prior art, when using an application on a plurality of intelligent terminals, a user downloads an application installation package on each intelligent terminal and then installs the application, thereby causing inconvenience during application installation. In addition, an account and a password that are corresponding to the application need to be entered each time the application is used, and when entering the account and the password, the user often enters an incorrect account and password and even forgets the account and the password. As a result, the user frequently enters the account and the password, causing inconvenience and lowering user experience.

SUMMARY

The present invention provides a data sharing method and a terminal, to implement sharing of application data between a plurality of intelligent terminals, prevent a user from frequently installing an application and entering an account and a password, and improve user experience.

According to one aspect, the present invention provides a data sharing method, where the method includes:

receiving, by a first terminal, a gesture operation instruction that is entered by a user for an application, where the application is an application that is selected by the user and whose data is to be shared with a second terminal; determining, by the first terminal based on the received gesture operation instruction, a near-field wireless transmission mode for data transmission with the second terminal; and transmitting, by the first terminal, the data of the application to the second terminal based on the determined near-field wireless transmission mode for data transmission with the second terminal, so that the second terminal displays the data of the application and starts the application.

The data of the application may specifically include account information and password information of the application, or include application installation information and application setting information of the application. The near-field wireless transmission mode includes any one of a Bluetooth transmission mode, or a near field communication NFC transmission mode, or an infrared transmission mode.

In the present invention, after determining, based on the gesture operation instruction that is entered by the user for the application, the near-field wireless transmission mode for data transmission with the another terminal, the first terminal may directly transmit the data of the application to the second terminal, so that the user no longer obtains the data of the application when using the application on the second terminal. This implements sharing of application data between a plurality of intelligent terminals, prevents the user from performing frequent operations, improves user experience, and also saves the user's time.

The data sharing method provided above may be further applied to non-near-field transmission between the first terminal and the second terminal.

In a possible design, the determining, by the first terminal based on the gesture operation instruction, a near-field wireless transmission mode for data transmission with the second terminal specifically includes:

enabling, by the first terminal based on the gesture operation instruction, a near-field-wireless-transmission-mode selection mode of the first terminal; selecting, by the user, a wireless transmission mode displayed by the first terminal; and determining, by the first terminal based on a received select operation instruction, the near-field wireless transmission ode for data transmission with the second terminal.

In a possible design, after the determining, by the first terminal based on the gesture operation instruction, a near-field wireless transmission mode for data transmission with the second terminal, the method further includes:

determining, by the first terminal, whether the first terminal has enabled the near-field wireless transmission mode selected by the user; and if the first terminal has enabled the near-field wireless transmission mode selected by the user establishing, by the first terminal, a wireless connection to the second terminal after the second terminal has enabled the same near-field wireless transmission mode.

In a possible design, the method further includes:

if the first terminal does not enable the near-field wireless transmission mode selected by the user, enabling, by the first terminal, the near-field wireless transmission mode selected by the user; and establishing, by the first terminal, a wireless connection to the second terminal after the second terminal has enabled the same near-field wireless transmission mode.

In a possible design, before the transmitting, by the first terminal, the data of the application to the second terminal based on the determined near-field wireless transmission mode for data transmission with the second terminal, the method further includes:

enabling, by the first terminal, a security authentication mode of the first terminal;

in the security authentication mode, determining, by the first terminal, whether the first terminal and the second terminal have logged in to a same cloud account; and if the first terminal and the second terminal have logged in to the same cloud account, transmitting, by the first terminal, the data of the application to the second terminal based on the determined near-field wireless transmission mode for data transmission with the second terminal.

In the present invention, the first terminal performs security authentication on the cloud account bound to the first terminal, so as to ensure data security during data transmission.

In a possible design, the method further includes:

if the first terminal and the second terminal do not log in to the same cloud account, displaying, by the first terminal, prompt information, where the prompt information is used to enable the second terminal to log in to the cloud account; and after the second terminal logs in to the cloud account, transmitting, by the first terminal, the data of the application to the second terminal based on the determined near-field wireless transmission mode for data transmission with the second terminal.

In a possible design, before the transmitting, by the first terminal, the data of the application to the second terminal based on the determined near-field wireless transmission mode for data transmission with the second terminal, the method further includes:

enabling, by the first terminal, a security authentication mode of the first terminal;

in the security authentication mode, obtaining, by the first terminal, first user characteristic information of the user;

determining, by the first terminal, whether the first user characteristic information matches stored second user characteristic information; and if the first user characteristic information matches the second user characteristic information, transmitting, by the first terminal, the data of the application to the second terminal based on the determined near-field wireless transmission mode for data transmission with the second terminal.

The user characteristic information includes any one of facial characteristic information of the user, or fingerprint characteristic information of the user, or retina characteristic information of the user.

In the present invention, the first terminal performs security authentication on the user characteristic information entered by the user, so as to ensure data security during data transmission.

In a possible design, before the transmitting, by the first terminal, the data of the application to the second terminal, the method further includes:

setting, by the first terminal, a transmission attribute for transmitting the data of the application to the second terminal by the first terminal; and transmitting, by the first terminal, the data of the application to the second terminal based on a setting result.

In the present invention, the first terminal sets the transmission attribute, so as to ensure reliability of data transmission and avoid repeated transmission.

According to another aspect, the present invention provides a terminal, configured to perform near-field transmission between the terminal and another terminal, where the terminal includes:

a receiving unit, configured to receive a gesture operation instruction that is entered by a user for an application, where the application is an application that is selected by the user and whose data is to be shared with the another terminal;

a determining unit, configured to determine, based on the gesture operation instruction, a near-field wireless transmission mode for data transmission with the another terminal; and a sending unit, configured to transmit the data of the application to the another terminal based on the determined near-field wireless transmission mode for data transmission with the another terminal, so that the another terminal displays the data of the application and starts the application.

In a possible design, the determining unit is specifically configured to enable, based on the gesture operation instruction, a near-field-wireless-transmission-mode selection mode of the terminal;

the receiving unit is further configured to receive a select operation instruction of the user, where the select operation instruction is an operation of selecting, by the user, the near-field wireless transmission mode displayed by the terminal; and the determining unit is specifically configured to determine, based on the select operation instruction, the near-field wireless transmission mode for data transmission with the another terminal.

In a possible design, the terminal further includes: a first judging unit, configured to determine whether the terminal has enabled the near-field wireless transmission mode selected by the user; and an establishment unit, configured to: if the terminal has enabled the near-field wireless transmission mode selected by the user, establish a wireless connection to the another terminal after the another terminal has enabled the same near-field wireless transmission mode.

In a possible design, the terminal further includes: a first enabling unit, configured to: if the terminal does not enable the near-field wireless transmission mode selected by the user, enable the near-field wireless transmission mode selected by the user; and p the establishment unit is further configured to establish a wireless connection to the another terminal after the another terminal has enabled the same near-field wireless transmission mode.

In a possible design, the terminal further includes: a second enabling unit, configured to enable a security authentication mode of the terminal; and a second judging unit, configured to: in the security authentication mode, determine whether the terminal and the another terminal have logged in to a same cloud account; and the sending unit is further configured to: if the terminal and the another terminal have logged in to the same cloud account, transmit the data of the application to the another terminal based on the determined near-field wireless transmission mode for data transmission with the another terminal.

In a possible design, the terminal further includes: a display unit, configured to display prompt information if the terminal and the another terminal do not log in to the same cloud account, where the prompt information is used to enable the another terminal to log in to the cloud account; and the sending unit is further configured to: after the another terminal logs in to the cloud account, transmit the data of the application to the another terminal based on the determined near-field wireless transmission mode for data transmission with the another terminal.

In a possible design, the terminal further includes: a third enabling unit, configured to enable a security authentication mode of the terminal;

an obtaining unit, configured to: in the security authentication mode, obtain first user characteristic information of the user; and a third judging unit, configured to determine whether the first user characteristic information matches stored second user characteristic information; and the sending unit is further configured to: if the first user characteristic information matches the second user characteristic information, transmit the data of the application to the another terminal based on the determined near-field wireless transmission mode for data transmission with the another terminal.

In a possible design, the terminal further includes:

a setting unit, configured to set a transmission attribute for transmitting the data of the application to the another terminal by the terminal; and the sending unit is further configured to transmit the data of the application to the another terminal based on a setting result.

According to still another aspect, the present invention provides a computer storage medium that is configured to store a computer software instruction used by the foregoing terminal. The computer software instruction includes a program designed for executing the foregoing aspects.

Compared with the prior art, the solutions provided in the present invention avoid repeated installation of an application on a plurality of terminals and an input error caused by repeated input by a user, implement sharing of application data between a plurality of intelligent terminals, simplify frequent user operations, improve user experience, and also save the user's time.

BRIEF DESCRIPTION OF DRAWINGS

FIG. 4-1-A, FIG. 4-1-B, FIG. 4-2-A, FIG. 4-2-B, FIG. 4-3-A and FIG. 4-3-B are schematic diagrams of determining, by a first terminal, a near-field wireless transmission mode for transmission with a second terminal according to an embodiment of the present invention;

FIG. 7-1 and FIG. 7-2 are schematic diagrams of cloud account security authentication according to an embodiment of the present invention;

FIG. 9-1, FIG. 9-2, and FIG. 9-3 are schematic diagrams of security authentication of user characteristic information according to an embodiment of the present invention;

DESCRIPTION OF EMBODIMENTS

The technical solutions according to the embodiments of the present invention are clearly and completely described in the following with reference to the accompanying drawings. Apparently, the described embodiments are merely some but no all of the embodiments of the present invention. All other embodiments obtained by a person of ordinary skill in the art based on the embodiments of the present invention without creative efforts shall fall within the protection scope of the present invention.

The embodiments of the present invention provide a data sharing method and a terminal based on the method. When a user using an application on a first terminal further wants to use the application on a second terminal, the user performs a gesture operation on the application on a display screen of the first terminal. The display screen may be specifically a touch display screen. The first terminal receives a gesture operation instruction that is entered by the user for the application; the first terminal determines, based on the gesture operation instruction, a near-field wireless transmission mode for data transmission with the second terminal; the first terminal transmits data of the application to the second terminal based on the determined near-field wireless transmission mode for data transmission with the second terminal; and the second terminal displays the data of the application and starts the application. This implements sharing of application data between a plurality of intelligent terminals, prevents a user from frequently installing an application and entering an account and a password, improves user experience, and saves the user's time.

For example, a user being outdoors with WIFI unavailable wants to continue playing a game of a mobile phone by using a tablet. In this case, the tablet may directly obtain an application installation file, an account and a password, a game progress, and the like from the mobile phone, with no need to wait for a WIFI environment to download the game from an application store and install the game or to consume mobile phone traffic of the user to set up a WIFI hotspot.

In addition to the application, data such as a photo, music, and a document may be further transferred between the terminals.

A plurality of users may further co-edit the transferred data to implement a multi-player game, complete a work together, or the like.

Figure 1:
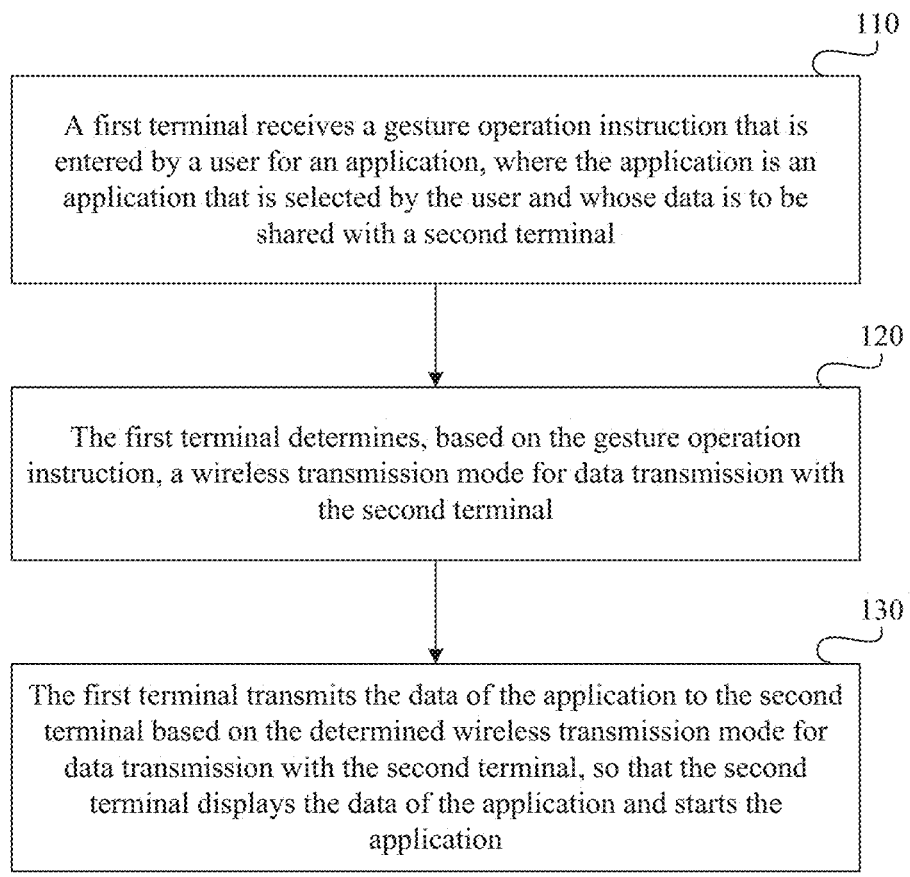
FIG. 1 is a flowchart of a data sharing method according to an embodiment of the present invention.

With reference to FIG. 1, the following describes the solutions provided in the embodiments of the present invention. FIG. 1 is a flowchart of a data sharing method according to an embodiment of the present invention. The method is executed by a first terminal. The terminal may be specifically an intelligent terminal, for example, a smartphone, a tablet computer, or a wearable device. The method specifically includes the following steps.

Step 110: The first terminal receives a gesture operation instruction that is entered by a user for an application, where the application is an application that is selected by the user and whose data is to be shared with a second terminal.

Specifically, when the user using an application on the first terminal further wants to use the application on the second terminal, the user performs a gesture operation on the application on a display screen of the first terminal. The display screen may be specifically a touch display screen.

Figure 2:
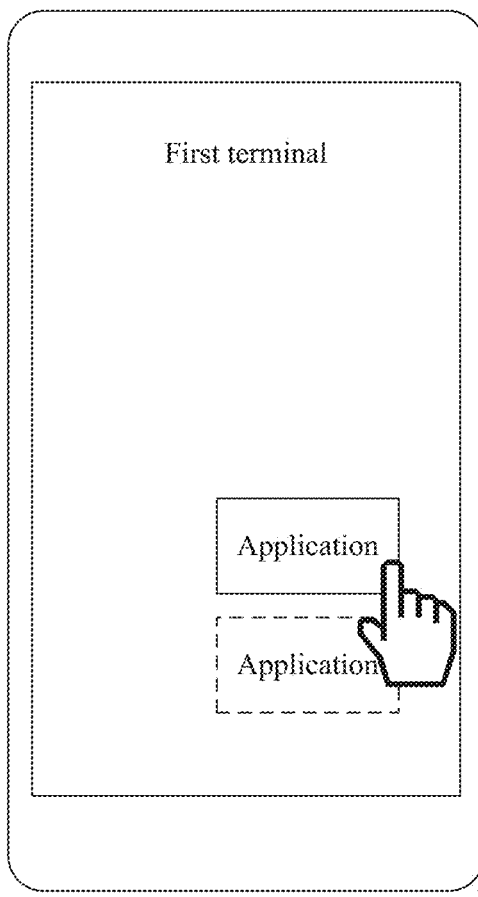
FIG. 2 is a schematic diagram of a gesture operation performed on an application by a user according to an embodiment of the present invention.

The first terminal receives the gesture operation instruction that is entered by the user for the application. As an example, not a limitation, the gesture operation instruction may be an operation of touching and holding the application on the first terminal and then sliding the application by the user. As shown in FIG. 2, FIG. 2 is a schematic diagram of the gesture operation performed on the application by the user according to this embodiment of the present invention.

It may be understood that the gesture operation instruction in this embodiment may alternatively be an operation of shortly tapping the application on the first terminal by the user, an operation of quickly tapping the application on the first terminal by the user, an operation of touching and holding the application on the first terminal and then rotating the application by the user, or the like.

It may be understood that the gesture operation instruction in the embodiments of the present invention may alternatively be replaced with another terminal-supported operation manner, for example, a button, sound control, light sensing, motion capture, an acceleration sensor, or a different force input or floating input on a force-sensitive touchscreen.

Step 120: The first terminal determines, based on the gesture operation instruction, a near-field wireless transmission mode for data transmission with the second terminal.

Figure 3:
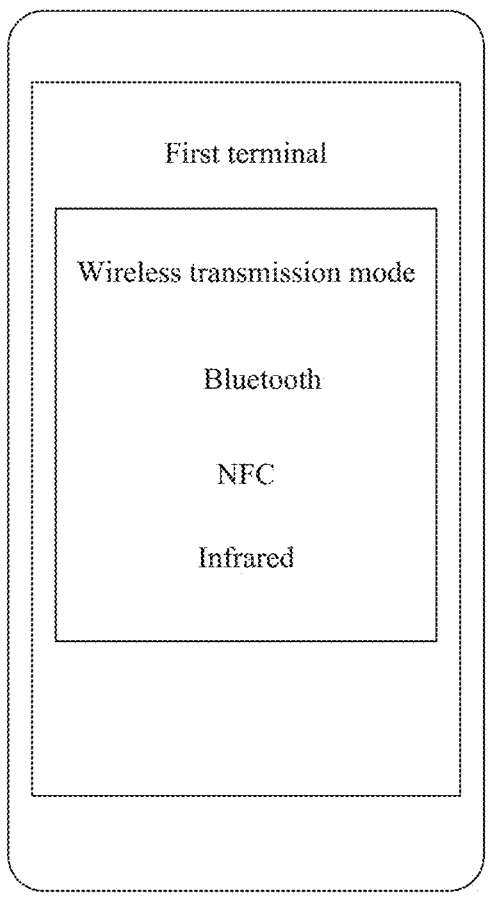
FIG. 3 is a schematic diagram of a near-field-wireless-transmission-mode selection mode according to an embodiment of the present invention.

Specifically, after receiving the gesture operation instruction entered by the user, the first terminal enables, based on the gesture operation instruction, a near-field-wireless-transmission-mode selection mode of the first terminal. As shown in FIG. 3, FIG. 3 is a schematic diagram of the near-field-wireless-transmission-mode selection mode according to this embodiment of the present invention.

A wireless transmission mode is a mode in which a near-field wireless technology is used for data transmission, and mainly includes such technologies as Bluetooth, Near Field Communication (English: Near Field Communication, NFC for short), infrared, Wireless Fidelity (English: Wireless Fidelity, WiFi for short), ultra wideband (English: Ultra Wideband, UWB for short), radio frequency identification (English: Radio Frequency Identification, RFID for short), and ZigBee (ZigBee).

The following uses Table 1 to describe the wireless transmission mode.

It can be learned from Table 1 that the Bluetooth, NFC, and infrared wireless transmission modes are applicable to a near-field transmission scenario. Therefore, in this embodiment of the present invention, the Bluetooth, NFC, and infrared wireless transmission modes are selected as the near-field wireless transmission mode.

In FIG. 3, this embodiment of the present invention provides three near-field wireless transmission modes, namely, the Bluetooth transmission mode, the NFC transmission mode, and the infrared transmission mode. The user may perform a select operation on the foregoing near-field wireless transmission modes provided by the first terminal. The first terminal receives a select operation instruction of the user, where the select operation instruction is an operation of selecting, by the user, the near-field wireless transmission mode displayed by the terminal. The first terminal determines, based on the select operation instruction entered by the user, the near-field wireless transmission mode for data transmission with the second terminal.

In an example, as shown in FIG. 4-1, FIG. 4-1 is a schematic diagram of determining, by the first terminal, the near-field wireless transmission mode for transmission with the second terminal according to this embodiment of the present invention. In FIG. 4-1-A, the near-field wireless transmission ode selected by the user on the first terminal is the "Bluetooth transmission mode". When the user selects the "Bluetooth transmission mode", the first terminal receives the select operation instruction entered by the user, and marks the "Bluetooth transmission mode" to determine the near-field wireless transmission mode for data transmission with the second terminal.

It may be understood that the user may alternatively select the "NFC transmission mode" or the "infrared transmission mode" as the near-field wireless transmission mode for data transmission between the first terminal and the second terminal, as shown in FIG. 4-2 and FIG. 4-3. A specific process of determining the near-field wireless transmission mode is similar to that described above. Details are not described herein again.

TABLE 1

Comparison of wireless transmission modes

| | Wireless transmission mode | | | | | | |
|---|---|---|---|---|---|---|---|
| | Bluetooth | NFC | Infrared | WiFi | UWB | RFID | ZigBee |
| Transmission distance | About 10 m | 1 m | Extremely short | About 90 m | 10-20 m | Several meters to tens of meters | 75 m-2 km |
| Transmission speed | 1 mb/s | 424 k | 4 m & 16 m | 11 mbps-108 mbps | More than hundreds of kbps | 1 k | 40-250 kbit/s |
| Operating band | 2.4 GHz | 13.56 MHz | / | 2.4G & 5G | 806-960 MHz, 1710-1885 MHz, 2500-2690 MHz | 125-135 KHz, 13.56 MHz, 860-960 MHz | 2.4 GHz |
| Input power | Medium | Low | / | Low | Low | Low | Low |
| Cost price | Low | Low | Low | Low | Low | Low | Low |
| Immunity to interference | High | Extremely high | High | Low | High | High | Medium |
| Protocol | IEEE 802.15.1x | ISO/IEC18092, ISO/IEC21481 | / | IEEE802.11g, IEEE802.11b | Not customized | / | IEEE 802.15.4 |
| Technical feature | Small volume and a universal interface. | Ad hoc network and wireless extension | Object impenetrable and obstacle-triggered reflection | Large coverage area | / | / | / |
| Application field | Mobile devices and peripherals | Mobile phones and near field communication | Indoor transmission control | Small-scale access networking | Short-range, large-volume, and high-speed transmission | Data reading and barcode replacement | Industrial control and healthcare |

Step 130: The first terminal transmits the data of the application to the second terminal based on the determined near-field wireless transmission mode for data transmission with the second terminal, so that the second terminal displays the data of the application and starts the application.

Figure 5:
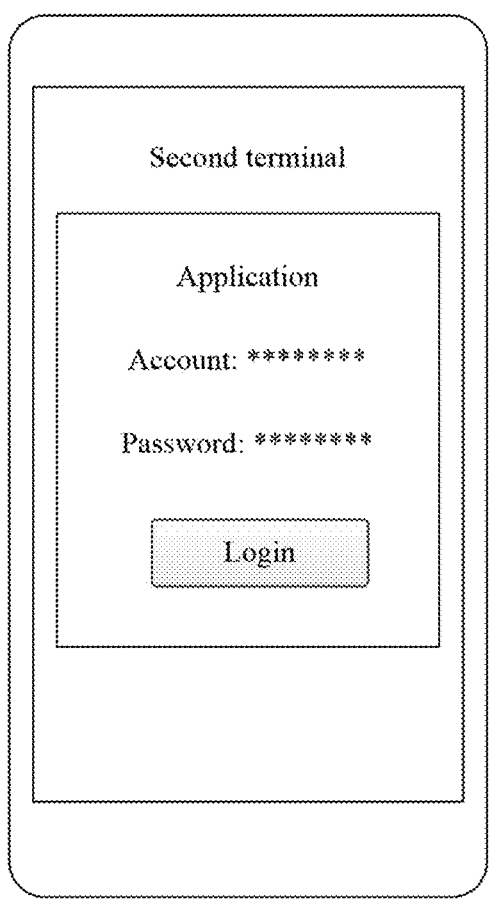
FIG. 5 is a schematic diagram of sharing application data with a second terminal according to an embodiment of the present invention.

Specifically, after the first terminal determines the near-field wireless transmission mode for data transmission with the second terminal, the first terminal establishes a wireless connection to the second terminal. The first terminal transmits the data of the application to the second terminal by using an established wireless connection link to the second terminal. As shown in FIG. 5, FIG. 5 is a schematic diagram of sharing application data with the second terminal according to this embodiment of the present invention. The second terminal displays the data of the application and starts the application, so as to implement sharing of application data between a plurality of intelligent terminals. This prevents the user from performing frequent operations, improves user experience, and also saves the user's time.

In an example, the application data transmitted by the first terminal to the second terminal may be specifically account information and password information of the application, as shown in FIG. 5. After establishing the wireless connection to the second terminal, the first terminal may directly transmit the account information and the password information of the application to the second terminal, so that when logging in to the application on the second terminal, the user may no longer enter the account information and the password information. This avoids repeated input each time the user logs in to the application and an input error caused by the repeated input, implements sharing of application data between a plurality of intelligent terminals, prevents the user from frequently entering an account and a password, improves user experience, and also saves the user's time.

In another example, alternatively, the application data transmitted by the first terminal to the second terminal may be specifically application installation information and application setting information of the application. After the first terminal establishes the wireless connection to the second terminal, the first terminal sends an application data obtaining request to a cloud server. The request includes a name of the application. The cloud server obtains the related application installation information and application setting information of the application from a local database based on the name of the application. The cloud server feeds back an application data obtaining response to the first terminal. The response includes the related application installation information and application setting information of the application. The first terminal directly transmits the application installation information and the application setting information to the second terminal. The user installs the application on the second terminal. In this case, the second terminal does not enable a Wi-Fi connection, and the application can be directly installed, with no need to establish a hotspot connection to the first terminal. This avoids frequent installation when the user uses the application on different terminals, implements sharing of application data between a plurality of intelligent terminals, improves user experience, and also saves the user's time.

Further, after the application is installed on the second terminal, the first terminal may further directly transmit account information and password information of the application to the second terminal, so that the user may no longer enter the account information and the password information when logging in to the application on the second terminal. This avoids repeated input each time the user logs in to the application and an input error caused by the repeated input.

It may be understood that if the first terminal has stored the related application installation information and application setting information of the application, the first terminal may determine a related file of the application from a memory of the first terminal based on the name of the application, and obtain, from the file, the related application installation information and application setting information of the application. The first terminal then directly transmits the application installation information and the application setting information to the second terminal. The user installs the application on the second terminal.

Specifically, the first terminal may determine the related file of the application in an installation process, may determine the related file of the application by using a cloud database or a local database, or may determine the related file of the application by monitoring a daily activity of the application.

Optionally, after step 120 in this embodiment of the present invention, the method further includes a step of determining, by the terminal, whether the near-field wireless transmission mode selected by the user has been enabled and establishing the wireless connection to the second terminal.

Specifically, the first terminal determines whether the first terminal has enabled the near-field wireless transmission mode selected by the user. If the first terminal has enabled the near-field wireless transmission mode selected by the user, the first terminal establishes the wireless connection to the second terminal after the second terminal has enabled the same near-field wireless transmission mode. If the first terminal does not enable the near-field wireless transmission mode selected by the user, the first terminal enables the near-field wireless transmission mode selected by the user; and the first terminal establishes the wireless connection to the second terminal after the second terminal has enabled the same near-field wireless transmission mode.

Further, in this embodiment of the present invention, after the first terminal determines that the first terminal has enabled the near-field wireless transmission mode selected by the user, the first terminal may display prompt information. The prompt information is used to prompt the user that the near-field wireless transmission mode should be enabled on the second terminal, so that the first terminal establishes the wireless connection to the second terminal. It may be understood that the near-field wireless transmission mode enabled by the second terminal is the same as the near-field wireless transmission mode that is selected by the user on the first terminal.

After the first terminal determines that the first terminal has not enabled the near-field wireless transmission mode selected by the user, the first terminal may further display prompt information. The prompt information is used to prompt the user that the first terminal itself has enabled the near-field wireless transmission mode selected by the user, and prompt the user that the near-field wireless transmission mode should be enabled on the second terminal, so that the first terminal establishes the wireless connection to the second terminal.

An example is shown in FIG. 4-1. In FIG. 4-1-A, the near-field wireless transmission mode selected by the user on the first terminal is the "Bluetooth transmission mode". The first terminal marks the "Bluetooth transmission mode" to determine the near-field wireless transmission mode for data transmission with the second terminal. The first terminal determines whether the first terminal has enabled the "Bluetooth transmission mode". If the first terminal has enabled the "Bluetooth transmission mode", the first terminal displays prompt information. The prompt information is used to prompt the user that the "Bluetooth transmission mode" should be enabled on the second terminal. The first terminal establishes the wireless connection to the second terminal after the second terminal also enables the "Bluetooth transmission mode".

In FIG. 4-1-B, the near-field wireless transmission mode selected by the user on the first terminal is the "Bluetooth transmission mode". The first terminal marks the "Bluetooth transmission mode" to determine the near-field wireless transmission mode for data transmission with the second terminal. The first terminal determines whether the first terminal has enabled the "Bluetooth transmission mode". If the first terminal does not enable the near-field wireless transmission mode selected by the user, the first terminal enables the near-field wireless transmission mode selected by the user, and displays prompt information. The prompt information is used to prompt the user that the first terminal itself has enabled the "Bluetooth transmission mode", and prompt the user that the "Bluetooth transmission mode" should be enabled on the second terminal. The first terminal establishes the wireless connection to the second terminal after the second terminal also enables the "Bluetooth transmission mode".

It may be understood that when the near-field wireless transmission mode selected by the user for data transmission between the first terminal and the second terminal is the "NFC transmission mode" or the "infrared transmission mode", the first terminal may also determine whether the corresponding near-field wireless transmission mode is enabled, to display prompt information and establish the wireless connection to the second terminal, as shown in FIG. 4-2 and FIG. 4-3. A specific process is similar to that described above. Details are not described herein main.

In this embodiment of the present invention, when establishing the wireless connection to the second terminal, the first terminal performs connection matching based on a different transmission mode that is selected. The connection matching process is a known technology, and details are not described herein.

Optionally, before step 130 in this embodiment of the present invention, the method further includes a step in which the terminal performs security authentication on a cloud account bound to the terminal or user characteristic information. With this step, data security can be ensured during data transmission.

Figure 6:
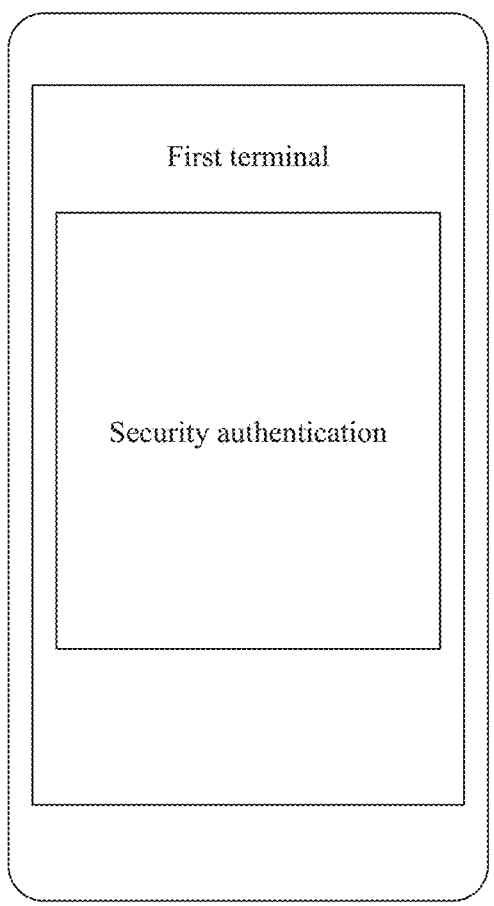
FIG. 6 is a schematic diagram of a security authentication mode according to an embodiment of the present invention.

Specifically, the first terminal enables a security authentication mode of the first terminal. As shown in FIG. 6, FIG. 6 is a schematic diagram of a security authentication mode according to an embodiment of the present invention. In the security authentication mode, the first terminal determines whether the first terminal and the second terminal have logged in to a same cloud account. If the first terminal and the second terminal have logged in to the same cloud account, the first terminal transmits the data of the application to the second terminal based on the determined near-field wireless transmission mode for data transmission with the second terminal. If the first terminal and the second terminal do not log in to the same cloud account, the first terminal displays prompt information, where the prompt information is used to enable the second terminal to log in to the cloud account, that is, prompt the user to log in to the cloud account on the second terminal: and after the second terminal logs in to the cloud account, the first terminal transmits the data of the application to the second terminal based on the determined near-field wireless transmission mode for data transmission with the second terminal.

Before the first terminal performs security authentication, the first terminal performs an automatic test on the cloud account (for example, a mailbox or a mobile phone number) bound to the first terminal. A specific automatic test process is: sending, by the first terminal, an automatic test message to the cloud server, where the automatic test message includes the cloud account bound to the first terminal. The cloud server queries, in a database of the cloud server based on the cloud account bound to the first terminal, whether another terminal device is bound to the cloud account and has logged in to the cloud account. The cloud server feeds back a query result to the first terminal. The first terminal determines, based on the query result, whether the first terminal and the second terminal have logged in to the same cloud account.

Figures 1, 7:
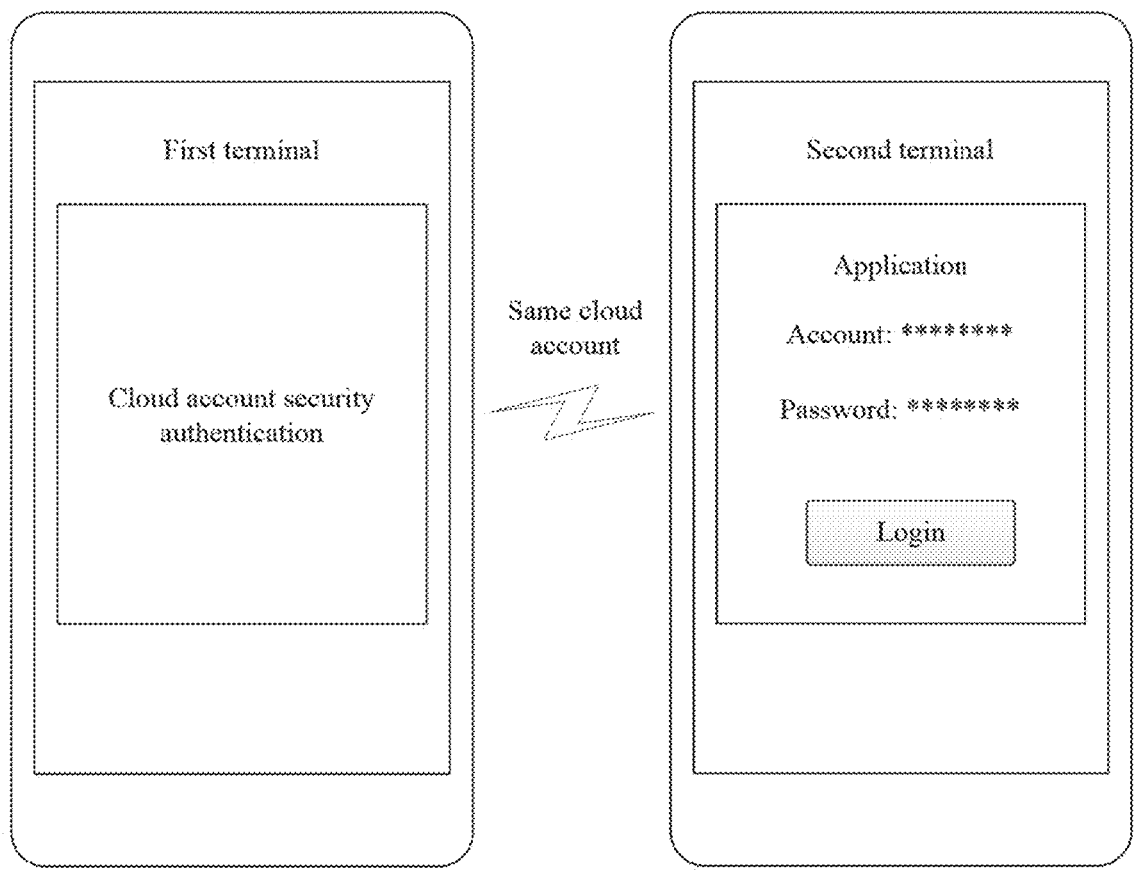
Figures 2, 7:
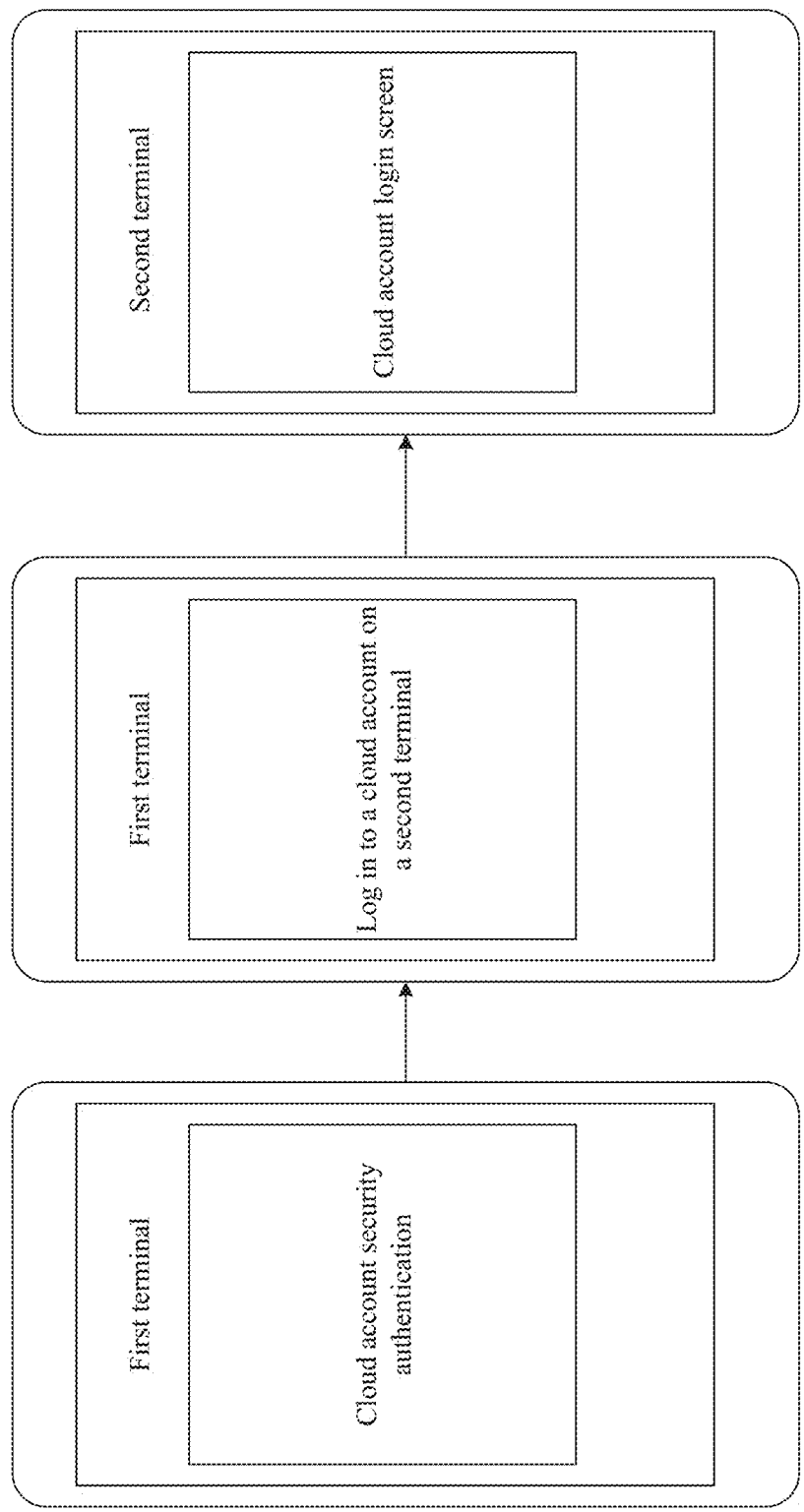

In an example, the cloud account may be specifically "*****@xx.com". The first terminal determines, based on the query result sent by the cloud server, whether the first terminal and the second terminal have logged in to the same cloud account. If the first terminal and the second terminal have logged in to the same cloud account, the first terminal transmits the data of the application to the second terminal based on the determined near-field wireless transmission mode for data transmission with the second terminal, as shown in FIG. 7-1. If the first terminal and the second terminal do not log in to the same cloud account, the first terminal displays prompt information, where the prompt information is used to prompt the user to log in to the cloud account on the second terminal; and after the second terminal logs in to the cloud account, the first terminal transmits the data of the application to the second terminal based on the determined near-field wireless transmission mode for data transmission with the second terminal, as shown in FIG. 7-2**.

It may be understood that when the first terminal and the second terminal have logged in to the same cloud account, the first terminal may also display prompt information, where the prompt information is used to prompt the user that both the first terminal and the second terminal have logged in to the same cloud account.

Figure 8:
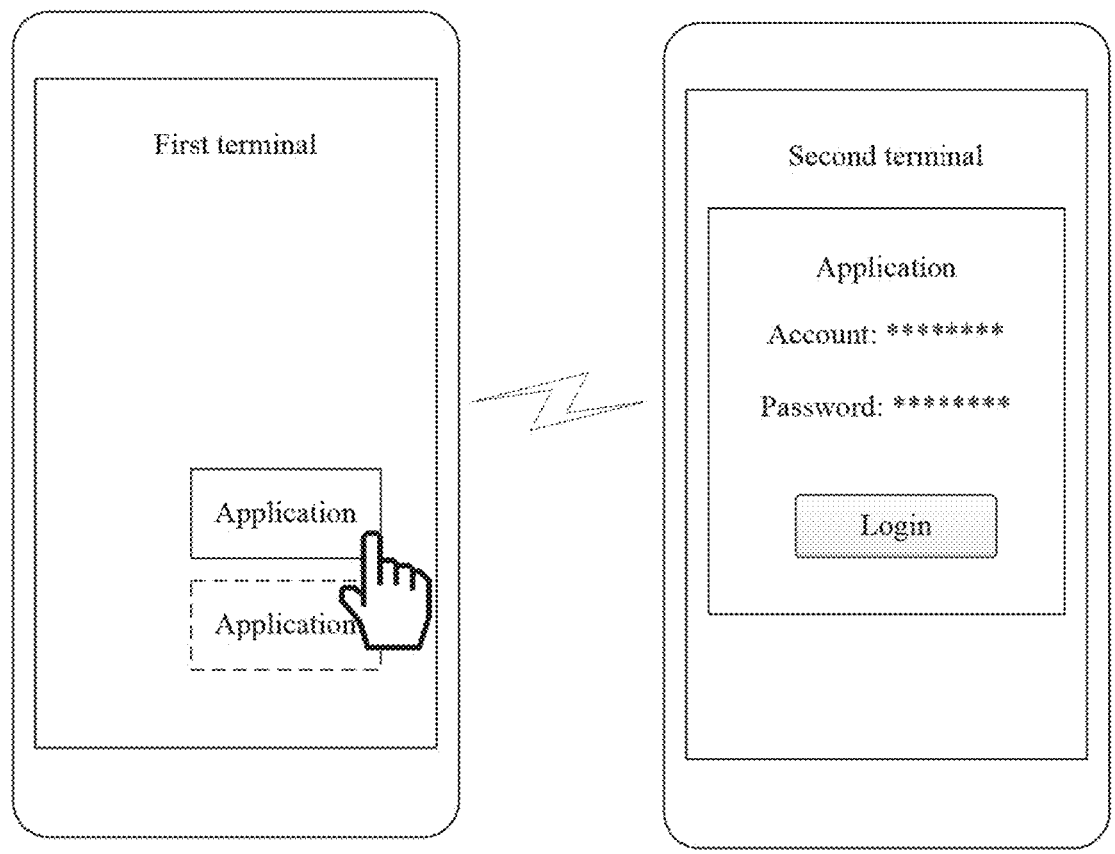
FIG. 8 is a schematic diagram of sharing, by a first terminal, application data with a second terminal according to an embodiment of the present invention.

It should be noted that if the first terminal initially determines that the first terminal and the second terminal have logged in to the same cloud account, the first terminal transmits the data of the application to the second terminal based on the determined near-field wireless transmission mode for data transmission with the second terminal. When the first terminal further needs to transmit the data of the application to the second terminal subsequently, the first terminal no longer needs to perform step 120 and the security authentication step. The first terminal may directly transmit the data of the application to the second terminal, that is, merely perform step 110 and step 130, as shown in FIG. 8.

If the first terminal initially determines that the first terminal and the second terminal do not log in to the same cloud account, after the second terminal logs in to the cloud account, the first terminal transmits the data of the application to the second terminal based on the determined near-field wireless transmission mode for data transmission with the second terminal. When the first terminal further needs to transmit the data of the application to the second terminal subsequently, the first terminal still needs to perform step 120 and the security authentication step.

Optionally, before step 130 in this embodiment of the present invention, the method further includes a step in which the terminal matches first user characteristic information entered by the user and stored second user characteristic information, to implement security authentication. With this step, data security can be ensured during data transmission.

Specifically, the first terminal enables a security authentication mode of the first terminal, as shown in FIG. 6. In the security authentication mode, the first terminal obtains the first user characteristic information of the user. The first terminal determines whether the first user characteristic information entered by the user matches the stored second user characteristic information. If the first user characteristic information matches the second user characteristic information, the first terminal transmits the data of the application to the second terminal based on the determined near-field wireless transmission mode for data transmission with the second terminal. If the first user characteristic information does not match the second user characteristic information, the first terminal does not transmit the data of the application to the second terminal, that is, the first terminal fails to share the data of the application with the second terminal.

In this embodiment of the present invention, the user characteristic information may be specifically facial characteristic information of the user, or fingerprint characteristic information of the user, or retina characteristic information of the user.

It may be understood that the second user characteristic information is recorded and stored in a memory of the first terminal by the first terminal in advance. The first terminal may collect the facial characteristic information of the user by using an image collection apparatus (for example, a camera), collect the fingerprint characteristic information of the user by using a fingerprint sensor or by using a display screen that has a fingerprint recognition function; and collect the retina characteristic information of the user by using a retina recognizer. The fingerprint sensor and the retina recognizer may be externally connected to the first terminal.

In an example, the user characteristic information is the facial characteristic information of the user. The first terminal collects, by using the camera, the facial characteristic information, that is, the first user characteristic information. The first terminal determines whether the first user characteristic information matches the stored second user characteristic information (in this embodiment of the present invention, that the first user characteristic information matches the second user characteristic information means that the first user characteristic information is the same as the second user characteristic information). If the first user characteristic information matches the second user characteristic information, the first terminal transmits the data of the application to the second terminal based on the determined near-field wireless transmission mode for data transmission with the second terminal. If the first user characteristic information does not match the second user characteristic information, the first terminal does not transmit the data of the application to the second terminal, that is, the first terminal fails to share the data of the application with the second terminal, as shown in FIG. 9-1.

Figures 1, 9:
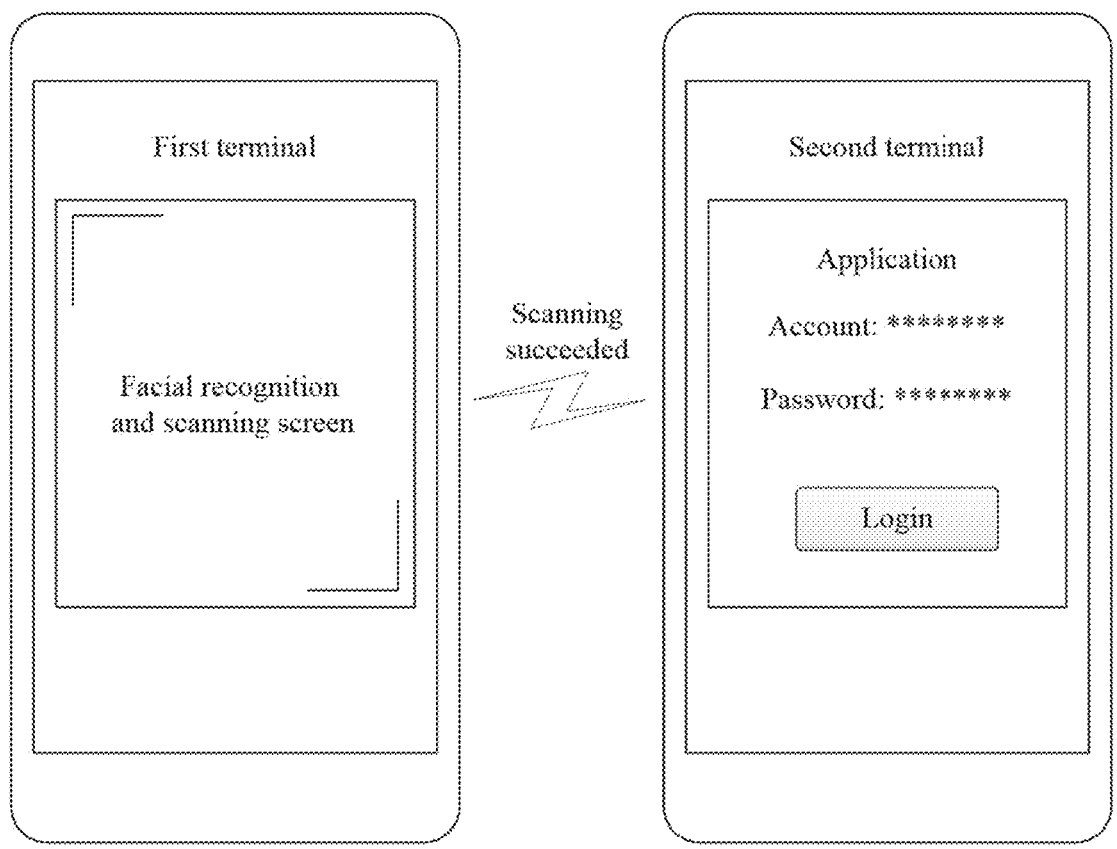
Figures 2, 9:
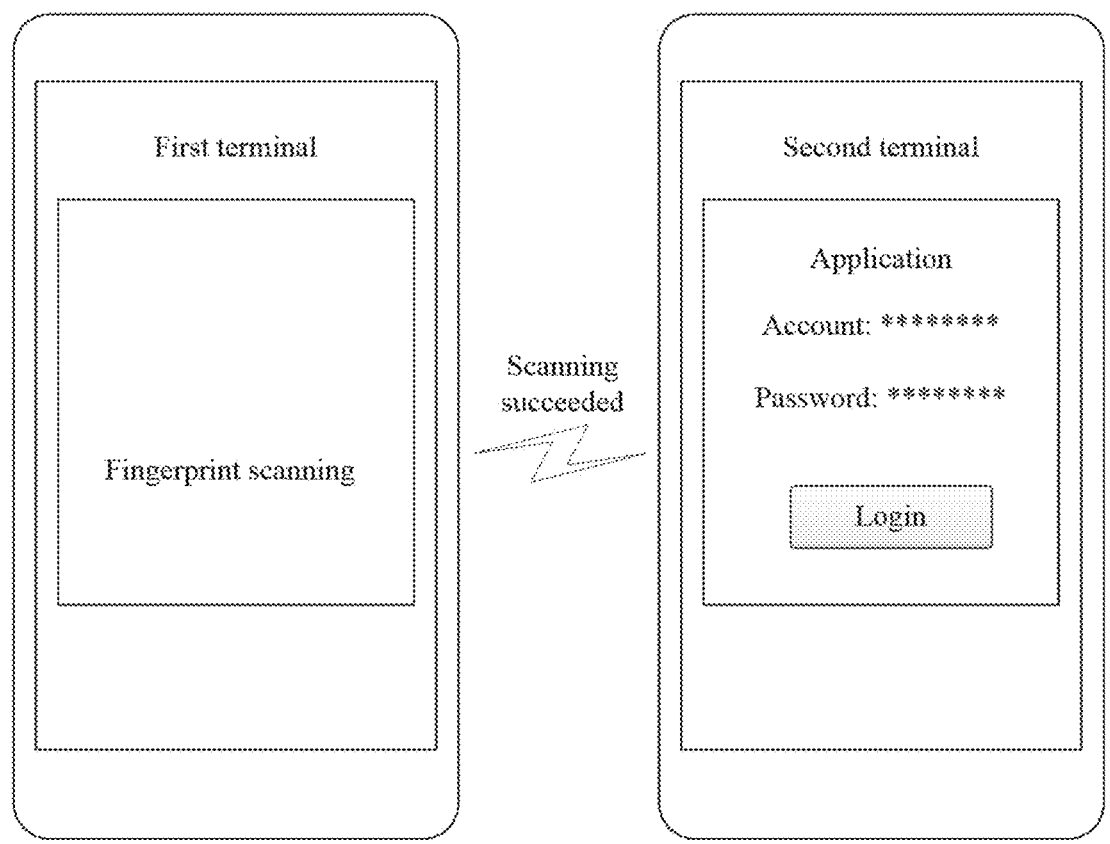
Figures 3, 9:
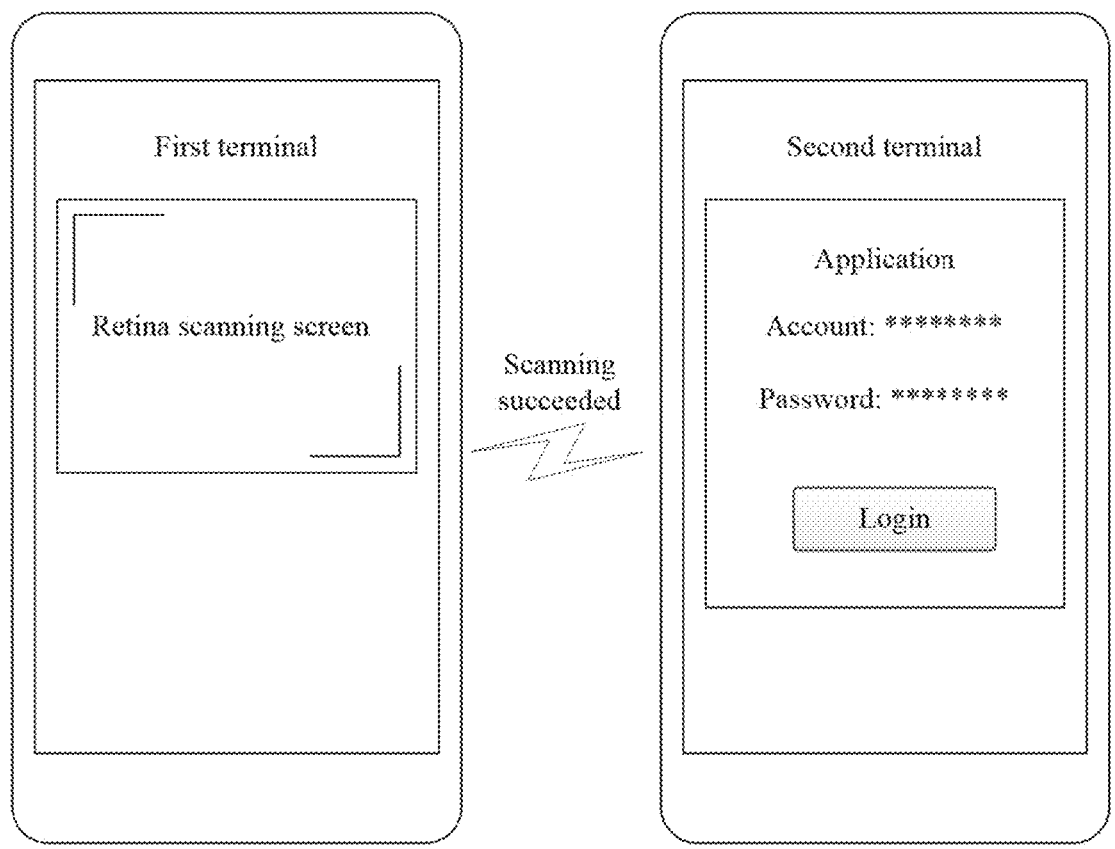

It may be understood that the user characteristic information obtained by the terminal may alternatively be the "fingerprint characteristic information of the user" or the "retina characteristic information of the user", as shown in FIG. 9-2 and FIG. 9-3. Specific authentication processes of the fingerprint characteristic information of the user and the retina characteristic information of the user are similar to the authentication process described above. Details are not described herein again.

Optionally, before step 130 in which the data of the application is transmitted to the second terminal in this embodiment of the present invention, the method further includes a step in which the terminal sets a transmission attribute. With this step, reliability of data transmission can be ensured, and repeated transmission can be avoided.

Specifically, the first terminal sets the transmission attribute of transmitting, by the first terminal, the data of the application to the second terminal; and the first terminal transmits the data of the application to the second terminal based on a setting result.

In an example, the transmission attribute may be specifically a validity time of the transmission, a quantity of valid times of the transmission, a valid state of the transmission, or the like.

For example, during the transmission, a transmission time of the first terminal exceeds a preset time threshold. In this case, the transmission of the first terminal is invalid. The first terminal may re-initiate transmission based on a current state. Alternatively, during the transmission, a quantity of transmission times of the first terminal exceeds a preset quantity threshold. In this case, the transmission of the first terminal is invalid. The first terminal may re-initiate transmission. Alternatively, during the transmission, if the first terminal or the second terminal is in a black screen state, the transmission of the first terminal is invalid. The first terminal may re-initiate transmission.

In another example, alternatively, the transmission attribute may be specifically a usage status of the application data on the second terminal, or the like.

Figure 10A:
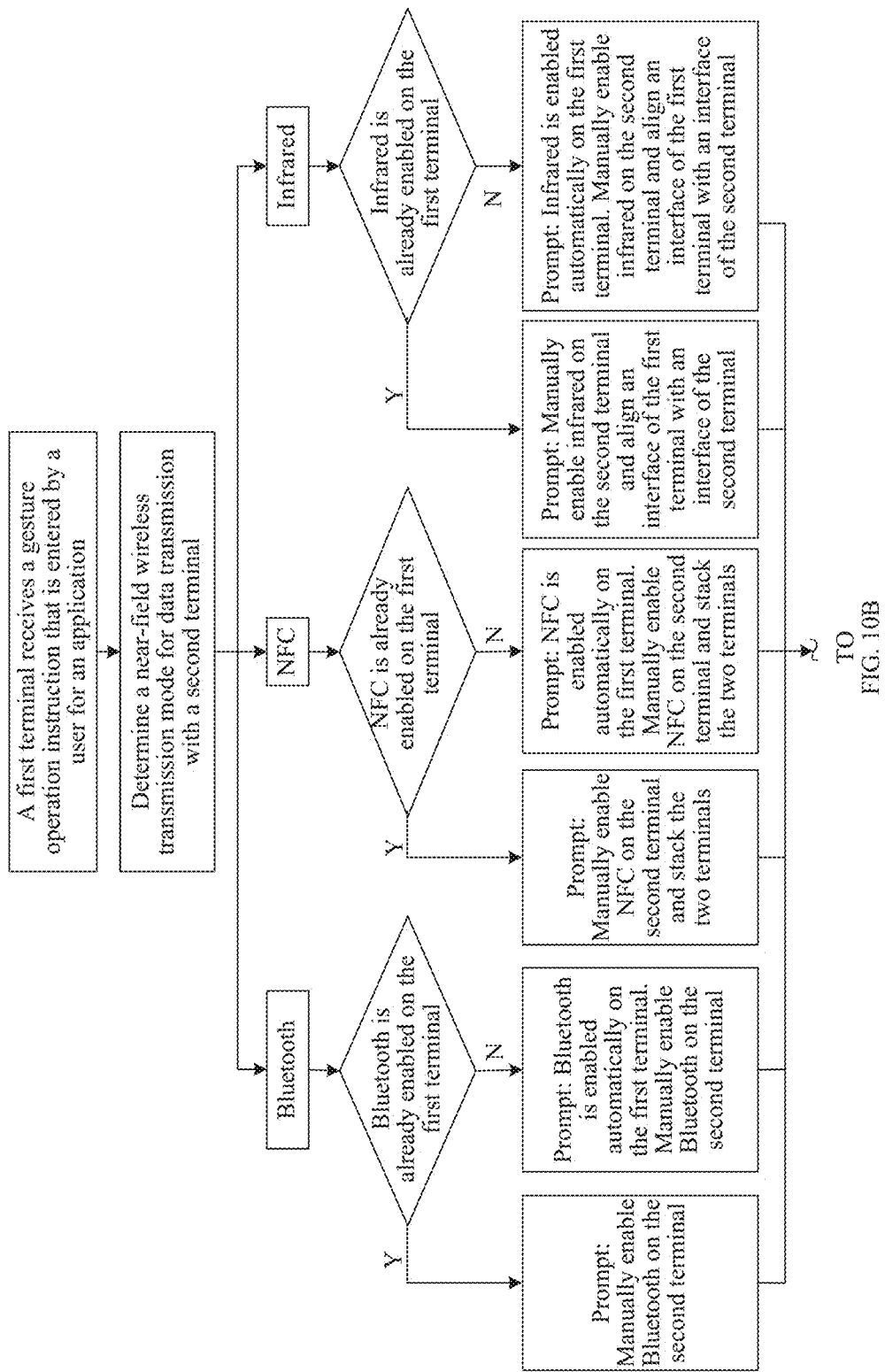
FIG. 10A and FIG. 10B are a flowchart of another data sharing method according to an embodiment of the present invention.
Figure 10B:
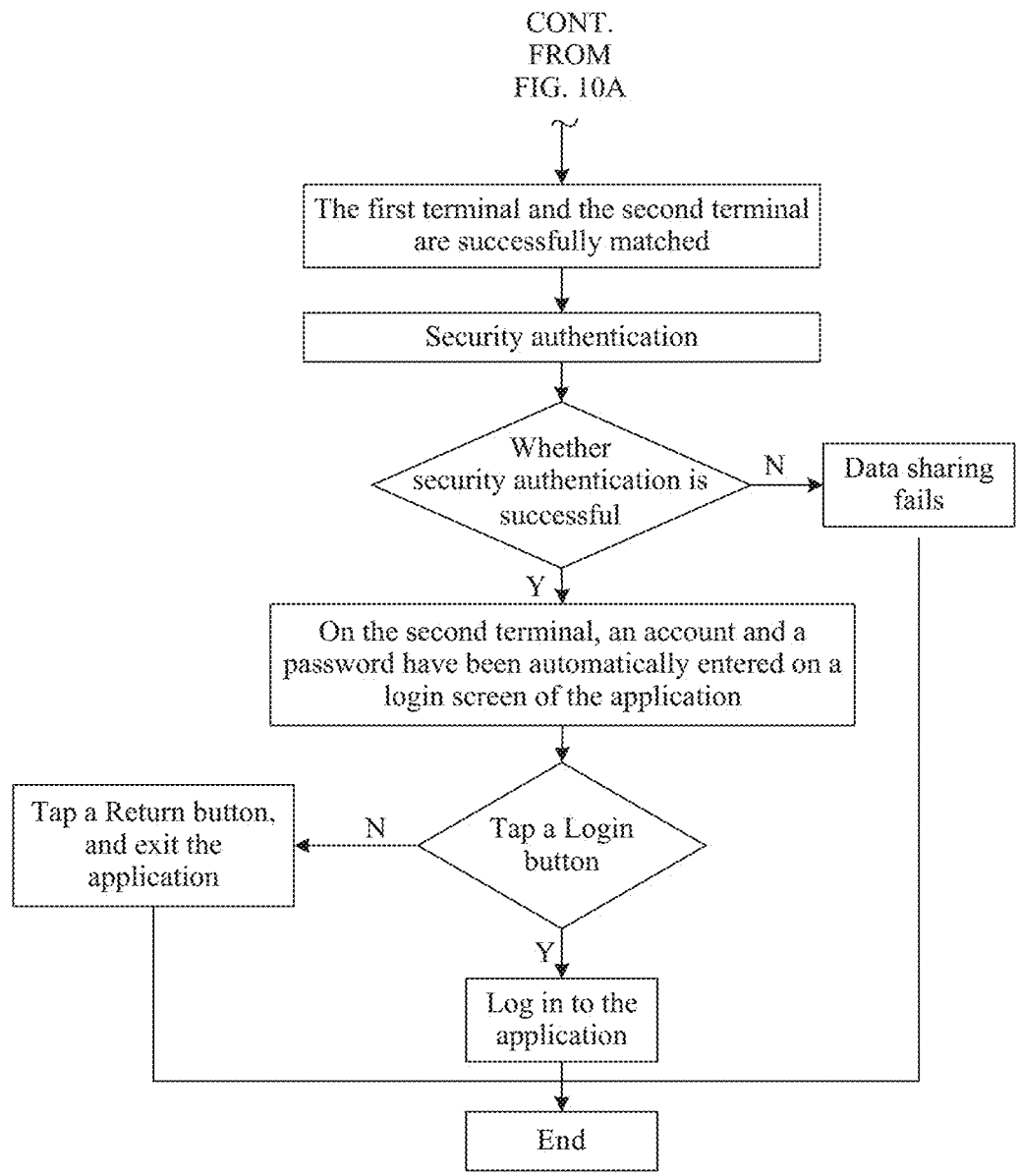

For example, the second terminal receives the application data (for example, an account and a password of the application) transmitted by the first terminal. After the second terminal logs in to the application once based on the application data, the application data transmitted by the first terminal becomes invalid. If the second terminal re-logs in to the application subsequently, the second terminal needs to request the first terminal to perform retransmission. Alternatively, the second terminal logs in to the application based on the application data. After the second terminal starts and exits the application, the application data transmitted by the first terminal becomes invalid. If the second terminal re-logs in to the application subsequently, the second terminal needs to request the first terminal to perform retransmission. FIG. 10 is a flowchart of another data sharing method according to an embodiment of the present invention. In FIG. 10, an example in which application data is an account and a password is used for description. A specific process has been described in detail in the foregoing embodiment. Details are not described herein again.

Figure 11:
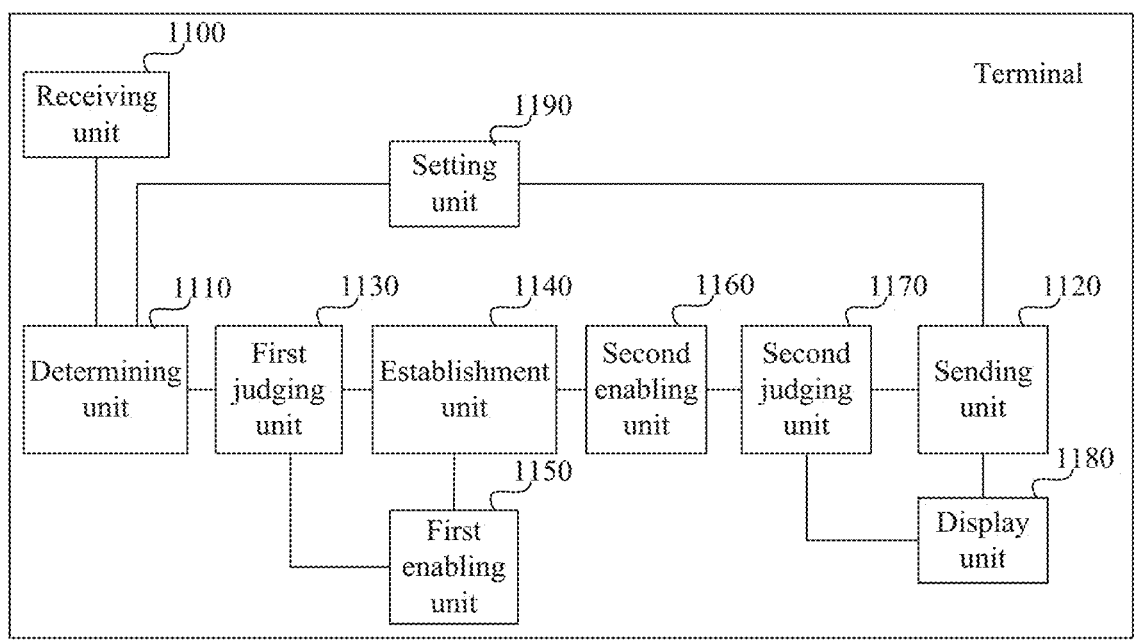
FIG. 11 is a schematic structural diagram of a terminal according to an embodiment of the present invention.

The data sharing method may be implemented based on the content described in the foregoing embodiments. Correspondingly, an embodiment of the present invention further provides a terminal, configured to implement the data sharing method provided in the foregoing embodiments. As shown in FIG. 11, the terminal includes: a receiving unit 1100, a determining unit 1110, and a sending unit 1120.

The receiving unit 1100 is configured to receive a gesture operation instruction that is entered by a user for an application, where the application is an application that is selected by the user and whose data is to be shared with the another terminal.

The determining unit 1110 is configured to determine, based on the gesture operation instruction, a near-field wireless transmission mode for data transmission with the another terminal.

The sending unit 1120 is configured to transmit the data of the application to the another terminal based on the determined near-field wireless transmission mode for data transmission with the another terminal, so that the terminal displays the data of the application and starts the application.

Further, the determining unit 1110 is specifically configured to enable, based on the gesture operation instruction, a near-field-wireless-transmission-mode selection mode of the terminal.

The receiving unit 1100 is further configured to receive a select operation instruction of the user, where the select operation instruction is an operation of selecting, by the user, the near-field wireless transmission mode displayed by the terminal.

The determining unit 1110 is specifically configured to determine, based on the select operation instruction, the near-field wireless transmission mode for data transmission with the another terminal.

Further, the terminal further includes: a first judging unit 1130, configured to determine whether the terminal has enabled the near-field wireless transmission mode selected by the user: and an establishment unit 1140, configured to: if the terminal has enabled the near-field wireless transmission mode selected by the user, establish a wireless connection to the another terminal after the another terminal has enabled the same near-field wireless transmission mode.

Further, the terminal further includes: a first enabling unit 1150, configured to: if the terminal does not enable the near-field wireless transmission mode selected by the user, enable the near-field wireless transmission mode selected by the user; and the establishment unit 1140 is further configured to establish a wireless connection to the another terminal after the another terminal has enabled the same near-field wireless transmission mode.

Further, the terminal further includes: a second enabling unit 1160, configured to enable a security authentication mode of the terminal; and a second judging unit 1170, configured to: in the security authentication mode, determine whether the terminal and the another terminal have logged in to a same cloud account.

The sending unit 1120 is further configured to: if the terminal and the another terminal have logged in to the same cloud account, transmit the data of the application to the another terminal based on the determined near-field wireless transmission mode for data transmission with the another terminal.

Further, the terminal further includes: a display unit 1180, configured to display prompt information if the terminal and the another terminal do not log in to the same cloud account, where the prompt information is used to enable the another terminal to log in to the cloud account.

The sending unit 1130 is further configured to: after the another terminal logs in to the cloud account, transmit the data of the application to the another terminal based on the determined near-field wireless transmission mode for data transmission with the another terminal.

Further, a setting unit 1190 is configured to set a transmission attribute for transmitting the data of the application to the another terminal by the terminal.

The sending unit 1120 is further configured to transmit the data of the application to the another terminal based on a setting result.

Figure 12:
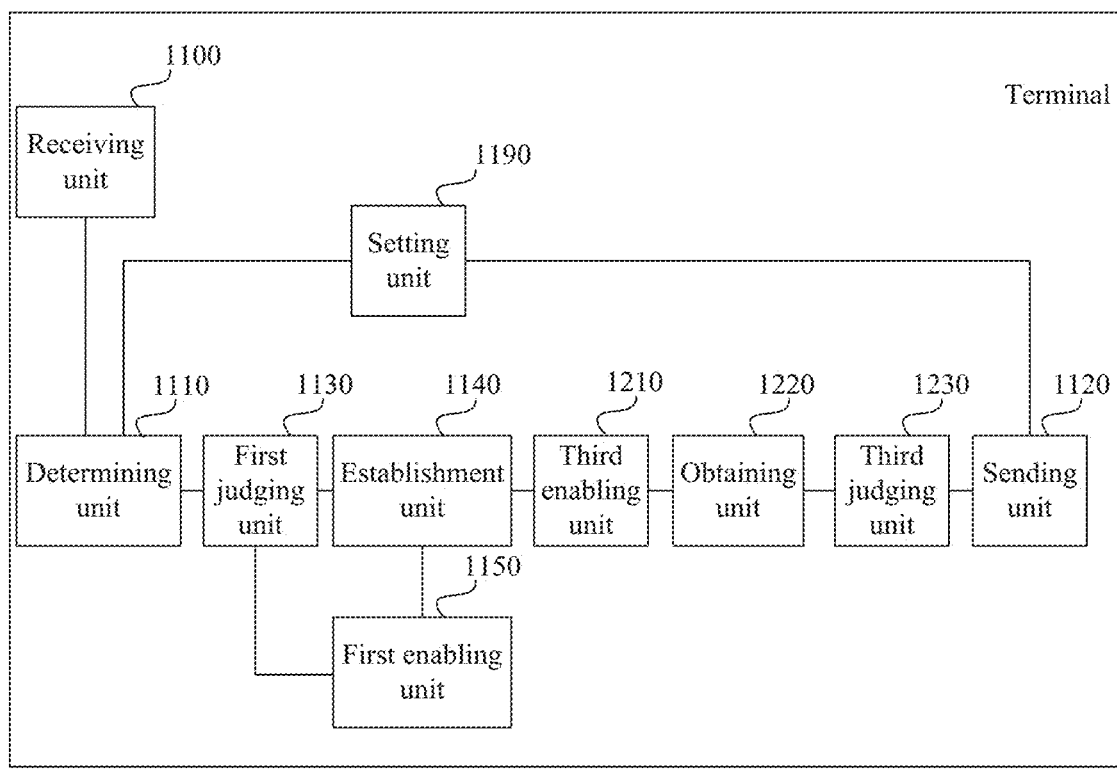
FIG. 12 is a schematic structural diagram of another terminal according to an embodiment of the present invention.

Further, an embodiment of the present invention further provides another terminal, configured to implement the data sharing method described in the foregoing embodiments, as shown in FIG. 12. In addition to the receiving unit 1100, the determining unit 1110, the sending unit 1120, the first judging unit 1130, the establishment unit 1140, the first enabling unit 1150, and the setting unit 1190 that are described in the foregoing terminal, the terminal further includes:

a third enabling unit 1210, configured to enable a security authentication mode of the terminal;

an obtaining unit 1220, configured to: in the security authentication mode, obtain first user characteristic information of the user; and a third judging unit 1230, configured to determine whether the first user characteristic information matches stored second user characteristic information.

The sending unit 1130 is further configured to: if the first user characteristic information matches the second user characteristic information, transmit the data of the application to the another terminal based on the determined near-field wireless transmission mode for data transmission with the another terminal.

Further, the near-field wireless transmission mode includes any one of a Bluetooth transmission mode, or a near field communication NFC transmission mode, or an infrared transmission mode.

Further, the user characteristic information includes any one of facial characteristic information of the user, or fingerprint characteristic information of the user, or retina characteristic information of the user.

Therefore, after determining, based on the gesture operation instruction that is entered by the user for the application, the near-field wireless transmission mode for data transmission with the another terminal, the terminal provided in this embodiment of the present invention may directly transmit the data of the application to the another terminal, so that the user no longer obtains the data of the application when using the application on the another terminal. This implements sharing of application data between a plurality of intelligent terminals, prevents the user from performing frequent operations, improves user experience, and also saves the user's time.

Figure 13:
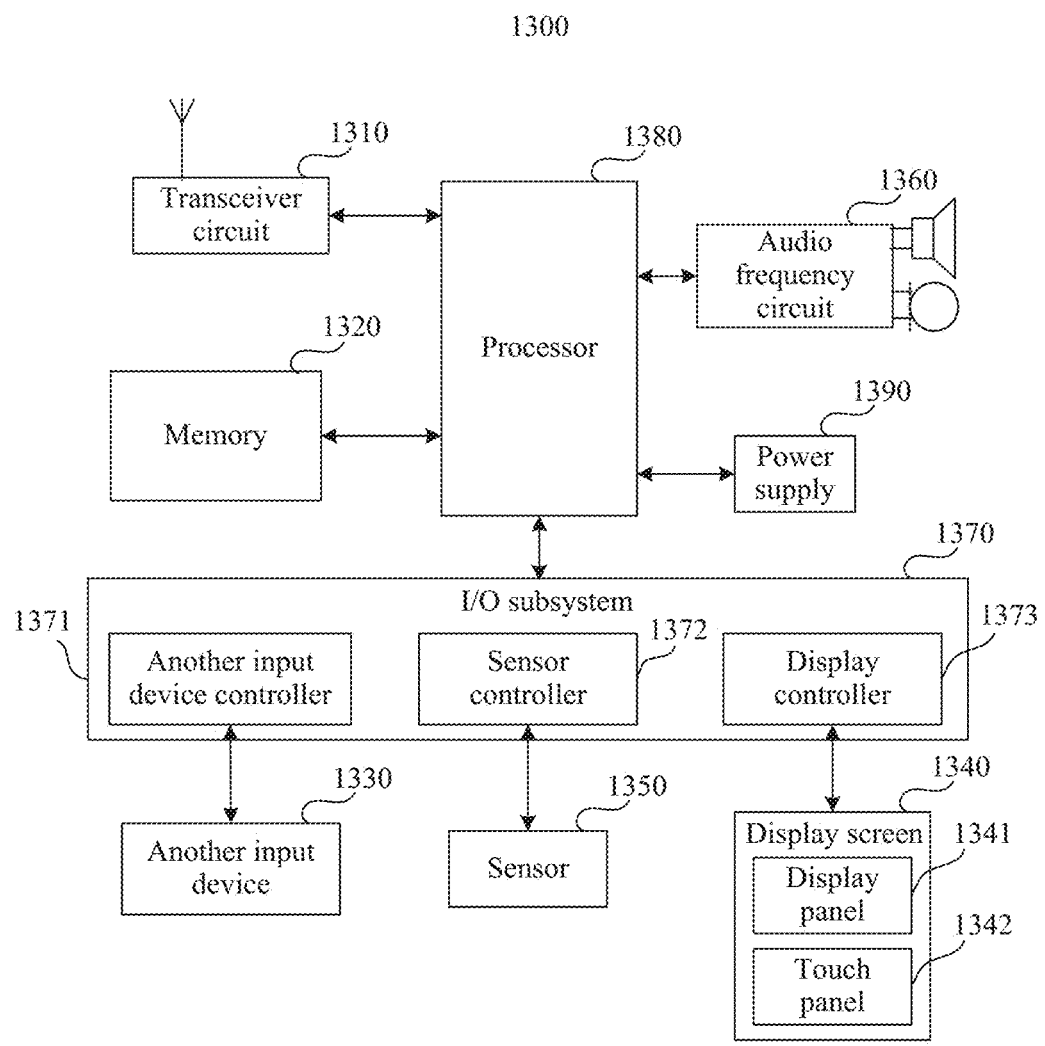
FIG. 13 is a schematic structural diagram of hardware of a terminal according to an embodiment of the present invention.

In addition, an embodiment of the present invention further provides a terminal, configured to implement the data sharing method in the foregoing embodiments of the present invention, as shown in FIG. 13. The terminal may include a smartphone, a tablet computer, a wearable device, or the like.

An example in which the terminal is a mobile phone is used. FIG. 13 shows a block diagram of a partial structure of a mobile phone 1300 related to an embodiment of the present invention. The mobile phone 1300 includes components such as a transceiver circuit 1310, a memory 1320, another input device 1330, a display screen 1340, a sensor 1350, an audio frequency circuit 1360, an I/O subsystem 1370, a processor 1380, and a power supply 1390. A person skilled in the art may understand that the mobile-phone structure shown in FIG. 13 does not constitute any limitation on a mobile phone, and the mobile phone may include more or fewer components than those shown in the figure, or some components may be combined, or some components may be split, or the components may be disposed in a different manner. A person skilled in the art may understand that the display screen 1340 belongs to a user interface (English: User Interface, UI for short), and the mobile phone 1300 may include more or fewer user interfaces than those shown in the figure.

The following describes each component of the mobile phone 1300 in detail with reference to FIG. 13.

The transceiver circuit 1310 may be configured to receive and send information, or receive and send a signal in a conversation process. The transceiver circuit 1310 in this embodiment of the present invention may be specifically a radio frequency (English: Radio Frequency, RF for short) circuit. In particular, the transceiver circuit 1310 transmits the information received by the terminal to the processor 1280 for processing. Generally, the transceiver circuit includes but is not limited to an antenna, at least one amplifier, a transceiver, a coupler, a low noise amplifier (English: Low Noise Amplifier, LNA for short), a duplexer, and the like. In addition, the transceiver circuit 1310 may further communicate with a network and another device through wireless communication. The wireless communication may use any communications standard or protocol, including but not limited to a Global System for Mobile Communications (English: Global System of Mobile communication, GSM), a general packet radio service (English: General Packet Radio Service, GPRS for short), code division multiple access (English: Division Multiple Access, CDMA for short), wideband code division multiple access (English: Wideband Code Division Multiple Access, WCDMA for short), Long Term Evolution (English: Long Term Evolution, LTE for short), an email, a short messaging service (English: Short Messaging Service, SMS for short), NFC, and the like.

Though not shown, a camera, a Bluetooth module, an infrared module, and the like may be further included in the mobile phone 1300. Details are not described herein.

The memory 1320 may be configured to store a software program and a module. The processor 1380 performs various function applications and data processing of the mobile phone 1300 by running the software program and the module that are stored in the memory 1320. The memory 1320 may mainly include a program storage area and a data storage area. The program storage area may store an operating system, an application program required by at least one function (for example, a sound playback function and an image playback function), and the like. The data storage area may store data (for example, audio data and a phone book) created based on use of the mobile phone 1300, and the like. In addition, the memory 1320 may include a high-speed random access memory, and may further include a non-volatile memory, for example, at least one magnetic disk storage device, a flash memory device, or another volatile solid-state storage device.

The another input device 1330 may be configured to receive entered digit or character information, and generate a key signal input related to a user setting and function control of the mobile phone 1300. Specifically, the another input device 1330 may include but is not limited to one or more of a physical keyboard, a functional key (such as a volume control button or a switch button), a trackball, a mouse, a joystick, an optical mouse (the optical mouse is a touch-sensitive surface that does not display a visual output, or is an extension of a touch-sensitive surface formed by a touchscreen), and the like. The another input device 1330 is connected to another input device controller 1371 of the I/O subsystem 1370, and performs signal exchange with the processor 1380 under control of the another input device controller 1371.

The display screen 1340 may be configured to display information entered by a user or information provided for the user, and various menus of the mobile phone 1300, and may further receive a user input. Specifically, the display screen 1340 may include a display panel 1341 and a touch panel 1342. The display panel 1341 may be configured in a form of a liquid crystal display (English: Liquid Crystal Display, LCD for short), an organic light-emitting diode (English: Organic Light-Emitting Diode, OLED for short), or the like. The touch panel 1342, also referred to as a touchscreen, a touch-sensitive screen, or the like, may collect a touch or non-touch operation performed by the user on the touch panel 1342 or near the touch panel 1342 (for example, an operation performed by the user on the touch panel 1342 or near the touch panel 1342 by using a finger or any proper object or accessory such as a stylus, where a somatosensory operation may be further included; and the operation includes an operation type such as a single-point control operation or a multi-point control operation), and drive a corresponding connection apparatus based on a preset program. Optionally, the touch panel 1342 may include two parts: a touch detection apparatus and a touch controller. The touch detection apparatus detects a touch orientation and a gesture of the user, detects a signal brought by the touch operation, and sends the signal to the touch controller. The touch controller receives touch information from the touch detection apparatus, converts the touch information into information that can be processed by the processor, and then sends the information to the processor 1380, and can receive and execute a command sent by the processor 1380. In addition, the touch panel 1342 may be implemented in various types, such as a resistive type, a capacitive type, an infrared type, and a surface acoustic wave type. The touch panel 1342 may also be implemented by using any future technology. Further, the touch panel 1342 may cover the display panel 1341. The user may perform, based on content displayed on the display panel 1241 (the displayed content includes but is not limited to a soft keyboard, a virtual mouse, a virtual button, an icon, and the like), an operation on or near the touch panel 1342 that covers the display panel 1341. After detecting the operation on or near the touch panel 1342, the touch panel 1342 transmits the operation to the processor 1380 by using the I/O subsystem 1370, to determine a user input. Then, the processor 1380 provides, by using the I/O subsystem 1370, a corresponding visual output on the display panel 1341 based on the user input. The touch panel 1342 and the display panel 1341 are used as two separate components to implement input and output functions of the mobile phone 1300 in FIG. 13. However, in some embodiments, the touch panel 1342 and the display panel 1341 may be integrated to implement the input and output functions of the mobile phone 1300.

The mobile phone 1300 may further include at least one sensor 1350, for example, a light sensor, a motion sensor, or another sensor. Specifically, the light sensor may include an ambient light sensor and a proximity sensor. The ambient light sensor is capable of adjusting a luminance of the display panel 1341 based on brightness of ambient light. The proximity sensor is capable of disabling the display panel 1341 and/or backlight when the mobile phone 1300 moves to an ear. As one type of motion sensor, an accelerometer sensor is capable of detecting a magnitude of an acceleration in each direction (generally, triple axes are available), and may detect, in a static state, a magnitude and a direction of gravity. The accelerometer sensor may be applied to a mobile phone posture recognition application (for example, screen switching between a landscape mode and a portrait mode, a related game, or magnetometer posture calibration), a vibration recognition-related function (for example, a pedometer and tapping), and the like. For another sensor that may further be disposed in the mobile phone 1300, such as a gyroscope, a barometer, a hygrometer, a thermometer, or an infrared sensor, details are not described herein.

In this embodiment of the present invention, the sensor 1350 is specifically a fingerprint sensor or a retina recognizer. The fingerprint sensor is configured to collect fingerprint characteristic information of the user and transmit a collection result to the processor 1380 by using the I/O subsystem 1370. Then, the processor 1380 provides, by using the I/O subsystem 1370, a corresponding visual output on the display panel 1341 based on the collection result. The retina recognizer is configured to collect retina characteristic information of the user and transmit a collection result to the processor 1380 by using the I/O subsystem 1370. Then, the processor 1380 provides, by using the I/O subsystem 1370, a corresponding visual output on the display panel 1341 based on the collection result.

The audio frequency circuit 1360, a speaker 1361, and a microphone 1362 may provide an audio interface between the user and the mobile phone 1300. The audio frequency circuit 1360 may transmit, to the speaker 1361, a signal converted from received audio data, and the speaker 1361 converts the signal into a sound signal for output. In addition, the microphone 1362 converts a collected sound signal into a signal, and the audio frequency circuit 1360 receives the signal, converts the signal into audio data, and then outputs the audio data to an RF circuit 1310, so as to send the audio data to, for example, another mobile phone, or outputs the audio data to the memory 1320 for further processing.

The I/O subsystem 1370 is configured to control an external input/output device, and may include the another input device controller 1371, a sensor controller 1372, and a display controller 1373. Optionally, one or more another input device controllers 1371 receive a signal from the another input device 1330 and/or send a signal to the another input device 1330. The another input device 1330 may include a physical button (a pressing button, a rocker button, and the like), a dial pad, a slide switch, a joystick, a click scroll wheel, and an optical mouse (the optical mouse is a touch-sensitive surface that does not display a visual output, or is an extension of a touch-sensitive surface formed by a touchscreen). It should be noted that the another input device controller 1371 may be connected to any one or more of the foregoing devices. The display controller 1373 in the I/O subsystem 1370 receives a signal from the display screen 1340 and/or sends a signal to the display screen 1340. After the display screen 1340 detects a user input, the display controller 1373 converts the detected user input into an interaction with a user interface object displayed on the display screen 1340, that is, implements a man-machine interaction. The sensor controller 1372 may receive a signal from one or more sensors 1350 and/or send a signal to one or more sensors 1350.

The processor 1380 is a control center of the mobile phone 1300, is connected to all components of the entire mobile phone by using all types of interfaces and lines, and implements functions and data processing of the mobile phone 1300 by running or executing the software program and/or the module stored in the memory 1320 and invoking data stored in the memory 1320, so as to perform overall monitoring on the mobile phone. Optionally, the processor 1380 may include one or more processing units. An application processor and a modem processor may be integrated in the processor 1380. The application processor primarily processes an operating system, a user interface, an application program, and the like, and the modem processor primarily processes wireless communication. It may be understood that the modem processor may not be integrated in the processor 1380.

The mobile phone 1300 may further include the power supply 1390 (for example, a battery) that supplies power to each component. The power supply may be logically connected to the processor 1380 by using a power management system, so that the power management system implements functions such as charging management, discharging management, and power consumption management.

In this embodiment of the present invention, the display screen 1340 is configured to receive a gesture operation instruction that is entered by the user for an application, where the application is an application that is selected by the user and whose data is to be shared with another terminal.

The processor 1380 is configured to determine, based on the gesture operation instruction, a near-field wireless transmission mode for data transmission with the another terminal.

The transceiver circuit 1310 is configured to transmit the data of the application to the another terminal based on the determined near-field wireless transmission mode for data transmission with the another terminal, so that the another terminal displays the data of the application and starts the application.

Further, the processor 1380 is specifically configured to enable, based on the gesture operation instruction, a near-field-wireless-transmission-mode selection mode of the terminal.

The display screen 1340 is further configured to receive a select operation instruction of the user, where the select operation instruction is an operation of selecting, by the user, the near-field wireless transmission mode displayed by the terminal.

The processor 1380 is specifically configured to determine, based on the select operation instruction, the near-field wireless transmission mode for data transmission with the another terminal.

Further, the processor 1380 is specifically configured to determine whether the terminal has enabled the near-field wireless transmission mode selected by the user.

If the terminal has enabled the near-field wireless transmission mode selected by the user, after the another terminal has enabled the same near-field wireless transmission mode, a wireless connection to the another terminal is established by using the transceiver circuit 1310.

Further, the processor 1380 is specifically configured to: if the terminal does not enable the near-field wireless transmission mode selected by the user, enable the near-field wireless transmission mode selected by the user; and after the another terminal has enabled the same near-field wireless transmission mode, establish a wireless connection to the another terminal by using the transceiver circuit 1310.

Further, the processor 1380 is specifically configured to enable a security authentication mode of the terminal;

in the security authentication mode, determine whether the first terminal and the another terminal have logged in to a same cloud account; and if the terminal and the another terminal have logged in to the same cloud account, transmit, by using the transceiver circuit 1310, the data of the application to the another terminal based on the determined near-field wireless transmission mode for data transmission with the another terminal.

Further, the processor 1380 is specifically configured to display prompt information by using the display screen 1340 if the terminal and the another terminal do not log in to the same cloud account, where the prompt information is used to enable the another terminal to log in to the cloud account; and after the another terminal logs in to the cloud account, transmit, by using the transceiver circuit 1310, the data of the application to the another terminal based on the determined near-field wireless transmission mode for data transmission with the another terminal.

Further, the processor 1380 is specifically configured to enable a security authentication mode of the terminal;

in the security authentication mode, obtain first user characteristic information of the user by using the camera or the sensor 1350;

determine whether the first user characteristic information matches stored second user characteristic information; and if the first user characteristic information matches the second user characteristic information, transmit, by using the transceiver circuit 1310, the data of the application to the another terminal based on the determined near-field wireless transmission mode for data transmission with the another terminal.

Further, the processor 1380 is further configured to set a transmission attribute for transmitting the data of the application to the another terminal by the terminal; and transmit, by using the transceiver circuit 1310, the data of the application to the another terminal based on a setting result.

Further, the near-field wireless transmission mode includes any one of a Bluetooth transmission mode, or a near field communication NFC transmission mode, or an infrared transmission mode.

Further, the user characteristic information includes any one of facial characteristic information of the user, or fingerprint characteristic information of the user, or retina characteristic information of the user.

Therefore, after determining, based on the gesture operation instruction that is entered by the user, the near-field wireless transmission mode for data transmission with the another terminal, the terminal provided in this embodiment of the present invention may directly transmit the data of the application to the another terminal, so that the user no longer obtains the data of the application when using the application on the another terminal. This implements sharing of application data between a plurality of intelligent terminals, prevents the user from performing frequent operations, improves user experience, and also saves the user's time.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention shall fall within the protection scope of the present invention.

What is claimed is:

1. A data sharing method performed by a first terminal, wherein the data sharing method comprises:
   receiving, from a user, a gesture operation instruction for an application that is selected by the user and that corresponds to data to be shared with a second terminal;
   determining, based on the gesture operation instruction, a near-field wireless transmission mode for data transmission with the second terminal;
   setting a transmission attribute for transmitting the data to the second terminal, wherein the transmission attribute comprises a valid transmission time, a quantity of transmission times, or a valid state of transmission;
   enabling a security authentication mode of the first terminal;
   determining, in the security authentication mode, whether the first terminal and the second terminal have logged in to a same cloud account; and
   transmitting the data to the second terminal based on the near-field wireless transmission mode and the transmission attribute, wherein the data comprises an account information, a password information, an application installation information, and a current state of the application, and wherein the first terminal prevents the user from having to download the application on the second terminal or from having to enter the account information or the password information to access the application on the second terminal by transmitting the data to the second terminal when the first terminal and the second terminal have logged in to the same cloud account.

2. The data sharing method of claim 1, wherein determining the near-field wireless transmission mode comprises:
   enabling, based on the gesture operation instruction, a near-field-wireless-transmission-mode selection mode of the first terminal;
   receiving a select operation instruction of the user, wherein the select operation instruction is an operation of selecting, by the user, a near-field wireless transmission mode displayed by the first terminal; and
   determining, based on the select operation instruction, the near-field wireless transmission mode for the data transmission with the second terminal.

3. The data sharing method of claim 2, wherein after determining the near-field wireless transmission mode for the data transmission with the second terminal, the data sharing method further comprises:
   determining whether the first terminal has enabled the near-field wireless transmission mode received from the user; and
   establishing a wireless coupling to the second terminal after the second terminal has enabled the same near-field wireless transmission mode when the first terminal has enabled the near-field wireless transmission mode received from the user.

4. The data sharing method of claim 3, further comprising:
enabling the near-field wireless transmission mode received from the user when the first terminal does not enable the near-field wireless transmission mode from the user; and
establishing the wireless coupling to the second terminal after the second terminal has enabled the same near-field wireless transmission mode.

5. The data sharing method of claim 1, further comprising displaying prompt information when the first terminal and the second terminal do not log in to the same cloud account, wherein the prompt information enables the second terminal to log in to the same cloud account, and wherein the first terminal prevents the user from having to download the application on the second terminal or from having to enter the account information or the password information to access the application on the second terminal by transmitting the data to the second terminal after the second terminal logs in to the same cloud account.

6. The data sharing method of claim 1, wherein before transmitting the data to the second terminal, the data sharing method further comprises:
obtaining, in the security authentication mode, first user characteristic information of the user; and
determining whether the first user characteristic information matches stored second user characteristic information,
wherein the first terminal prevents the user from having to download the application on the second terminal or from having to enter the account or the password to access the application on the second terminal by transmitting the data to the second terminal when the first user characteristic information matches the stored second user characteristic information.

7. A first terminal, comprising:
a memory configured to store code; and
a processor coupled to the memory, wherein the processor executes the code in the memory to cause the first terminal to:
receive a gesture operation instruction from a user for an application that is received from the user and that corresponds to data to be shared with a second terminal;
determine, based on the gesture operation instruction, a near-field wireless transmission mode for data transmission with the second terminal;
set a transmission attribute for transmitting the data to the second terminal, wherein the transmission attribute comprises a valid transmission time, a quantity of transmission times, or a valid state of transmission;
enable a security authentication mode of the first terminal;
determine, in the security authentication mode, whether the first terminal and the second terminal have logged in to a same cloud account; and
transmit the data to the second terminal based on the near-field wireless transmission mode and the transmission attribute, wherein the data comprises an account information, a password information, an application installation information, and a current state of the application, and wherein the first terminal prevents the user from having to download the application on the second terminal or from having to enter the account information or the password information to access the application on the second terminal by transmitting the data to the second terminal when the first terminal and the second terminal have logged in to the same cloud account.

8. The first terminal of claim 7, wherein to determine the near-field wireless transmission mode, the processor further executes the code in the memory to cause the first terminal to:
enable, based on the gesture operation instruction, a near-field-wireless-transmission-mode selection mode of the first terminal;
receive a select operation instruction of the user, wherein the select operation instruction is an operation of selecting, by the user, a near-field wireless transmission mode displayed by the first terminal; and
determine, based on the select operation instruction, the near-field wireless transmission mode for the data transmission with the second terminal.

9. The first terminal of claim 8, wherein after determining the near-field wireless transmission mode, the processor further executes the code in the memory to cause the first terminal to:
determine whether the first terminal has enabled the near-field wireless transmission mode, and
establish a wireless coupling to the second terminal after the second terminal has enabled a same near-field wireless transmission mode as the near-field wireless transmission mode and when the first terminal has enabled the near-field wireless transmission mode.

10. The first terminal of claim 9, wherein the processor further executes the code in the memory to cause the first terminal to:
enable the near-field wireless transmission mode; and
establish the wireless coupling to the second terminal after the second terminal has enabled the same near-field wireless transmission mode.

11. The first terminal of claim 7, wherein the processor further executes the code in the memory to cause the first terminal to:
display prompt information when the first terminal and the second terminal do not log in to the same cloud account, wherein the prompt information enables the second terminal to log in to the same cloud account; and
transmit the data to the second terminal based on the near-field wireless transmission mode for the data transmission with the second terminal after the second terminal logs into the same cloud account.

12. The first terminal of claim 7, wherein before transmitting the data to the second terminal, the processor further executes the code in the memory to cause the first terminal to:
obtain, in the security authentication mode, first user characteristic information of the user;
determine whether the first user characteristic information matches stored second user characteristic information; and
transmit the data to the second terminal based on the near-field wireless transmission mode for the data transmission with the second terminal when the first user characteristic information matches the stored second user characteristic information.

13. The data sharing method of claim 6, wherein the first user characteristic information comprises retina characteristic information of the user.

14. A computer program product comprising computer-executable instructions for storage on a non-transitory computer-readable medium that, when executed by a processor, cause a first terminal to:

receive, from a user, a gesture operation instruction for an application that is selected by the user and that corresponds to data to be shared with a second terminal;

determine, based on the gesture operation instruction, a near-field wireless transmission mode for data transmission with the second terminal;

set a transmission attribute for transmitting the data to the second terminal, wherein the transmission attribute comprises a valid transmission time, a quantity of transmission times, or a valid state of transmission;

enable a security authentication mode of the first terminal;

determine, in the security authentication mode, whether the first terminal and the second terminal have logged in to a same cloud account; and transmit the data to the second terminal based on the near-field wireless transmission mode and the transmission attribute, wherein the data comprises an account information, a password information, an application installation information, and a current state of the application, and wherein the first terminal prevents the user from having to download the application on the second terminal or from having to enter the account information or the password information to access the application on the second terminal by transmitting the data to the second terminal when the first terminal and the second terminal have logged in to the same cloud account.

15. The computer program product of claim 14, wherein the transmission attribute further comprises a usage status of the data on the second terminal.

16. The computer program product of claim 14, wherein the instructions further cause the first terminal to:

enable, based on the gesture operation instruction, a near-field-wireless-transmission-mode selection mode of the first terminal;

receive a select operation instruction of the user, wherein the select operation instruction is an operation of selecting, by the user, a near-field wireless transmission mode displayed by the first terminal; and determine, based on the select operation instruction, the near-field wireless transmission mode for the data transmission with the second terminal.

17. The computer program product of claim 16, wherein the instructions further cause the first terminal to:

determine whether the first terminal has enabled the near-field wireless transmission mode received from the user; and establish a wireless coupling to the second terminal after the second terminal has enabled the same near-field wireless transmission mode when the first terminal has enabled the near-field wireless transmission mode received from the user.

18. The data sharing method of claim 1, further comprising sending an application data obtaining request to a cloud server, wherein the application data obtaining request includes a name of the application.

19. The data sharing method of claim 18, further comprising obtaining, by the cloud server, the application installation information of the application from a local database based on the name of the application.

20. The data sharing method of claim 19, further comprising transmitting, by the cloud server, an application data obtaining response to the first terminal.

* * * * *